United States Patent
Kim et al.

(10) Patent No.: US 9,116,360 B2
(45) Date of Patent: Aug. 25, 2015

(54) STEREOSCOPIC IMAGE DISPLAY AND DRIVING METHOD THEREOF

(75) Inventors: Seonggyun Kim, Gunpo-si (KR); Jeongki Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 565 days.

(21) Appl. No.: 12/829,174

(22) Filed: Jul. 1, 2010

(65) Prior Publication Data

US 2011/0109733 A1 May 12, 2011

(30) Foreign Application Priority Data

Nov. 6, 2009 (KR) .......................... 10-2009-0107047

(51) Int. Cl.
*H04N 15/00* (2006.01)
*H04N 13/04* (2006.01)
*H04N 9/47* (2006.01)
*G02B 27/22* (2006.01)

(52) U.S. Cl.
CPC ........ *G02B 27/2264* (2013.01); *H04N 13/0438* (2013.01); *H04N 13/0497* (2013.01); *H04N 13/0422* (2013.01)

(58) Field of Classification Search
None
See application file for complete search history.

(56) References Cited

U.S. PATENT DOCUMENTS

| 2009/0040419 A1* | 2/2009 | Lee et al. ................... 349/61 |
| 2009/0066621 A1* | 3/2009 | Iwamoto et al. ........... 345/88 |
| 2009/0179850 A1* | 7/2009 | Chen et al. ................. 345/102 |
| 2010/0231696 A1* | 9/2010 | Slavenburg et al. ....... 348/53 |
| 2011/0007140 A1* | 1/2011 | Nakahata et al. ......... 348/56 |
| 2012/0257027 A1* | 10/2012 | Kawahara ................. 348/56 |

FOREIGN PATENT DOCUMENTS

| JP | 2003259395 | 9/2003 |
| WO | WO 2009069026 A2 * | 6/2009 |

* cited by examiner

*Primary Examiner* — Joseph Ustaris
*Assistant Examiner* — Kevin McInnish
(74) *Attorney, Agent, or Firm* — Dentons U.S. LLP

(57) ABSTRACT

A stereoscopic image display and a method of driving the same are disclosed. The stereoscopic image display includes shutter glasses including a left eye shutter and a right eye shutter that are alternately turned on and off in synchronization with a display device, a backlight unit that irradiates light to the display device and is periodically turned on and off, a controller that divides a first frame period into a first address period and a first vertical blanking period, divides a second frame period into a second address period and a second vertical blanking period, and controls so that durations of the first vertical blanking period and the second vertical blanking period are different from each other, and a driving circuit that supplies data to the display device during the first and second address periods under the control of the controller.

16 Claims, 18 Drawing Sheets

Normal Gamma

High Gamma (HG)

Low Gamma (LG)

STEREOSCOPIC IMAGE DISPLAY AND DRIVING METHOD THEREOF

This application claims the benefit of Korean Patent Application No. 10-2009-0107047 filed on Nov. 6, 2009, the entire contents of which is incorporated herein by reference for all purposes as if fully set forth herein.

BACKGROUND OF THE INVENTION

1. Field of the Invention

Embodiments of the invention relate to a stereoscopic image display and a method of driving the same.

2. Discussion of the Related Art

A stereoscopic image display is divided into a display using a stereoscopic technique and a display using an autostereoscopic technique.

The stereoscopic technique, which uses a parallax image of left and right eyes of a user with a high stereoscopic effect, includes a glass method and a non-glass method which have been put to practical use. In the glass method, a left and right parallax image is displayed on a direct-view display or a projector through a change in a polarization direction of the left and right parallax image or in a time-division manner, and a stereoscopic image is implemented using polarization glasses or liquid crystal shutter glasses. In the non-glass method, generally, an optical plate such as a parallax barrier and a lenticular lens separates an optical axis of the left and right parallax image, and a stereoscopic image is implemented.

U.S. Pat. No. 5,821,989 and US Publication No. 20070229395A1 are known to disclose an example of the glass type stereoscopic image display.

FIGS. 1 and 2 schematically illustrate a glass type stereoscopic image display. In FIGS. 1 and 2, a black region of a liquid crystal shutter glasses ST represents a shutter that blocks light traveling toward an observer (i.e., viewer), and a white region of the liquid crystal shutter glasses ST represents a shutter allowing transmission of light toward the observer.

FIG. 1 illustrates a time-division operation of left and right images when an impulse type display device DIS1 is selected in the glass type stereoscopic image display. In the impulse type display device DIS1 such as a cathode ray tube (CRT), immediately after data is completely written in a scanning direction, data of each pixel is erased.

In the stereoscopic image display illustrated in FIG. 1, during odd-numbered frame periods, a left eye shutter of the liquid crystal shutter glasses ST is open, and left eye image data $RGB_L$ is sequentially scanned on the impulse type display device DIS1. During even-numbered frame periods, a right eye shutter of the liquid crystal shutter glasses ST is open and right eye image data $RGB_L$ is sequentially scanned on the impulse type display device DIS1. Accordingly, the observer can view only a left eye image during the odd-numbered frame periods and a right eye image during the even-numbered periods, thereby feeling stereoscopy.

FIG. 2 illustrates a time-division operation of left and right images when a hold type display device DIS2 is selected in the glass type stereoscopic image display. In the hold type display device DIS2 such as a liquid crystal display (LCD), data written in pixels is hold until such time as data is written on a first line during a next frame period following a response completion time point after the data is written on the entire pixels because of to response time delay characteristics.

In the stereoscopic image display illustrated in FIG. 2, during an nth frame period, where n is a positive integer, the left eye shutter of the liquid crystal shutter glasses ST is open and left eye image data $RGB_L(Fn)$ is sequentially scanned on the hold type display device DIS2. While the left eye shutter of the liquid crystal shutter glasses ST is open, some pixels, to which the left eye image data $RGB_L(Fn)$ of the nth frame have not been written yet in the hold type display device DIS2, hold right eye image data $RGB_R(Fn-1)$ which had been already charged in an (n-1)th frame period. Accordingly, the observer can view an image of the right eye image data $RGB_R(Fn-1)$ of the (n-1)th frame as well as an image of the left eye image data $RGB_L(Fn)$ of the nth frame with his left eye during the nth frame.

In the stereoscopic image display illustrated in FIG. 2, during (n+1)th frame period, the right eye shutter of the liquid crystal shutter glasses ST is open and right eye image data $RGB_R(Fn+1)$ are sequentially scanned on the hold type display device DIS2. While the right eye shutter of the liquid crystal shutter glasses ST is open, some pixels, to which the right eye image data $RGB_R(Fn+1)$ have not been written yet on the hold type display device DIS2, hold left eye image data $RGB_L(Fn)$ which had been already charged in nth frame. Accordingly, the observer can view the image of the left eye image data $RGB_L(Fn)$ of the nth frame as well as an image of the right eye image data $RGB_R(Fn+1)$ of the (n+1)th frame with his right eye during the (n+1)th frame.

As can be seen from FIG. 2, the observer can feel a pseudo-stereoscopic vision at a time when the left eye image is changed to the right eye image or at a time when the right eye image is changed to the left eye image because of crosstalk between the left and right eye images generated in the hold type display device DISP2.

Thus, in order to improve the degradation of picture quality due to the response time delay of the stereoscopic image display as shown in FIG. 2, US Publication NO. 20070229395A1 disclosed a technique of addressing data more quickly than the related art on a liquid crystal display panel and extending a vertical blanking period. Also, this publication proposed a method of opening liquid crystal shutter glasses ST during a time period obtained by subtracting a liquid crystal response time from the extended vertical blanking period. In proposed method, the vertical blanking period without data is lengthened and an opening duration of the liquid crystal shutter glasses is reduced, thereby making an observer feel flickering. In addition, constructive interference occurs between light that transmits through the liquid crystal shutter and ambient light according to a correlation between an ON/OFF period of the liquid crystal shutter and that of the ambient light such as a fluorescent lamp, making the observer feel flicking more severely.

SUMMARY OF THE INVENTION

Exemplary embodiments of the invention provide a stereoscopic image display and a method of driving the same capable of preventing crosstalk between left and right eye images generated when a hold type display device is used.

In one aspect, there is a stereoscopic image display comprising a display device that displays a stereoscopic image, shutter glasses including a left eye shutter and a right eye shutter that are alternately turned on and off in synchronization with the display device, a backlight unit that irradiates light to the display device and is periodically turned on and off, a controller that divides a first frame period into a first address period and a first vertical blanking period, divides a second frame period into a second address period and a second vertical blanking period, and controls so that a duration of the first vertical blanking period and a duration of the second vertical blanking period are different from each other, and a driving circuit that supplies data to the display device during the first and second address periods under the control of the controller.

The duration of the second vertical blanking period may be longer than the duration of the first vertical blanking period.

The duration of the first vertical blanking period may be longer than the duration of the second vertical blanking period.

In another aspect, there is a method of driving a stereoscopic image display comprising dividing a first frame period into a first address period and a first vertical blanking period, dividing a second frame period into a second address period and a second vertical blanking period, and controlling so that a duration of the first vertical blanking period and a duration of the second vertical blanking period are different from each other, supplying data to a display device during the first and second address periods, alternately turning on and off a left eye shutter and a right eye shutter of shutter glasses in synchronization with the display device, and periodically turning on and off a backlight unit for irradiating light to the display device.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
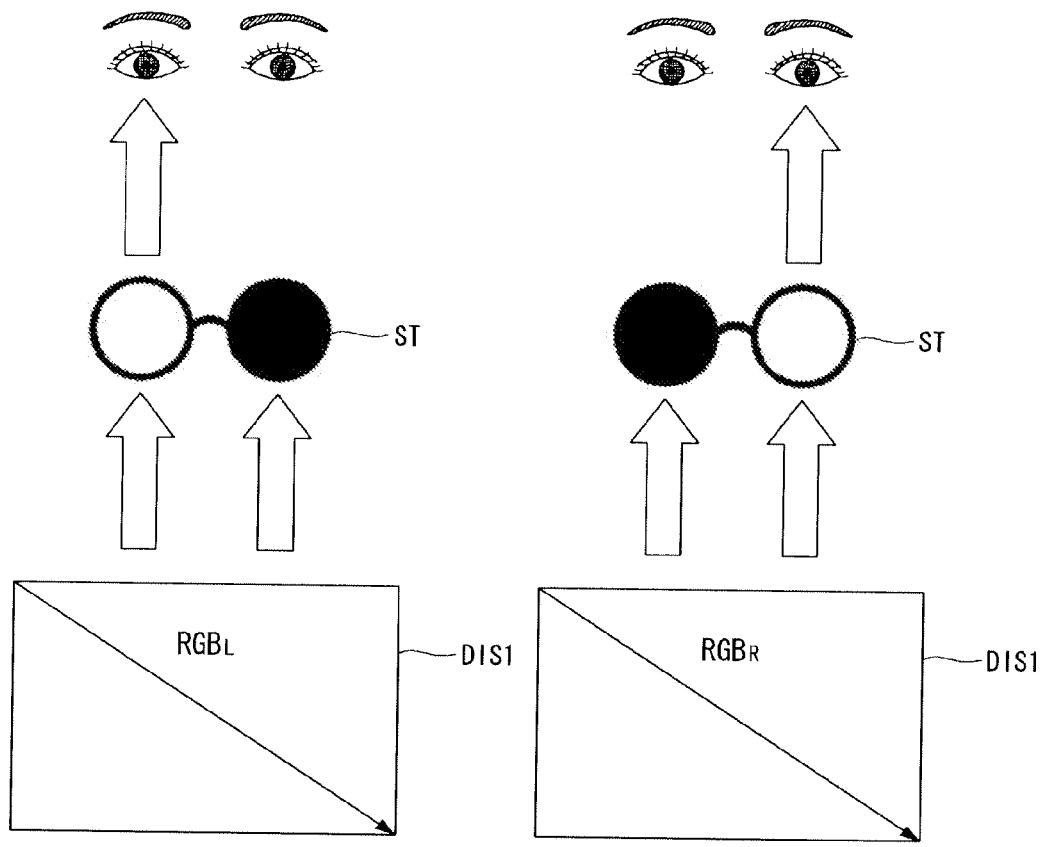
FIG. 1 illustrates a time-division operation of left and right images when an impulse type display device is selected in a glass type stereoscopic image display.
Figure 2:
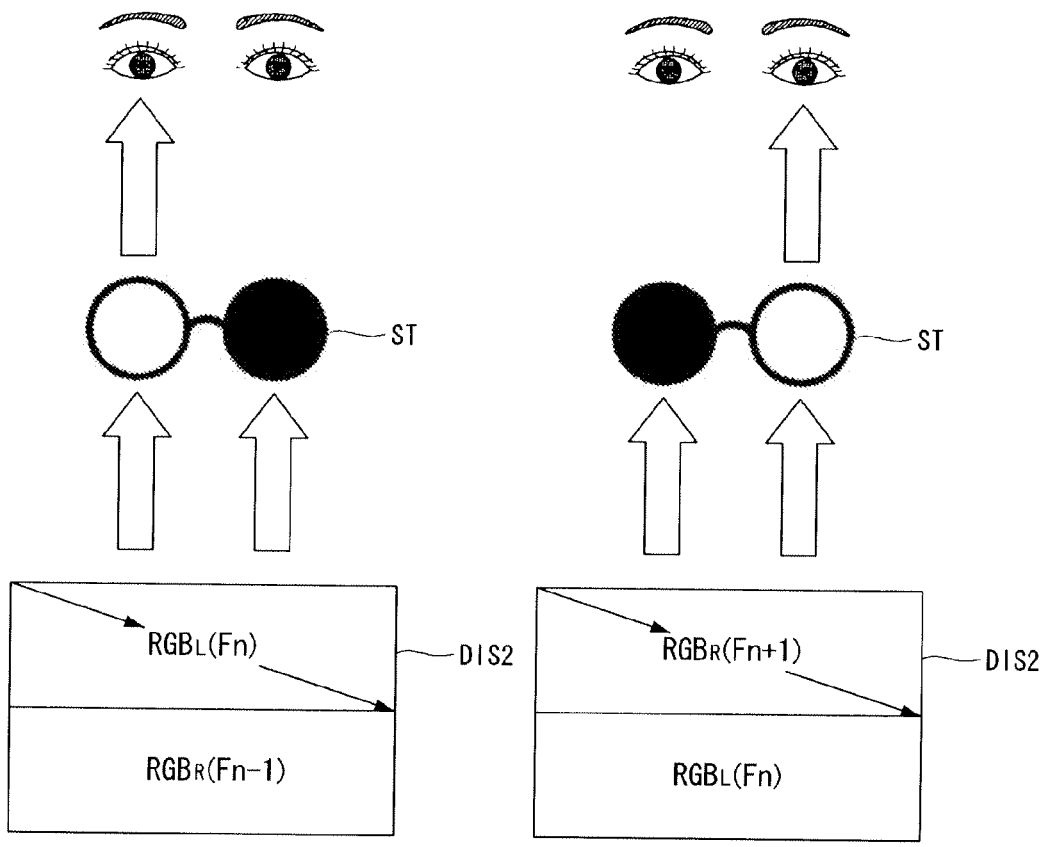
FIG. 2 illustrates a time-division operation of left and right images when a hold type display device is selected in a glass type stereoscopic image display.

The invention will be described more fully hereinafter with reference to the accompanying drawings, in which example embodiments of the inventions are shown. This invention may, however, be embodied in many different forms and should not be construed as limited to the embodiments set forth herein. Like reference numerals designate like elements throughout the specification. In the following description, if it is decided that the detailed description of known function or configuration related to the invention makes the subject matter of the invention unclear, the detailed description is omitted.

Names of elements used in the following description are selected in consideration of facility of specification preparation. Thus, the names of the elements may be different from names of elements used in a real product.

Reference will now be made in detail embodiments of the invention examples of which are illustrated in the accompanying drawings.

Figure 3:
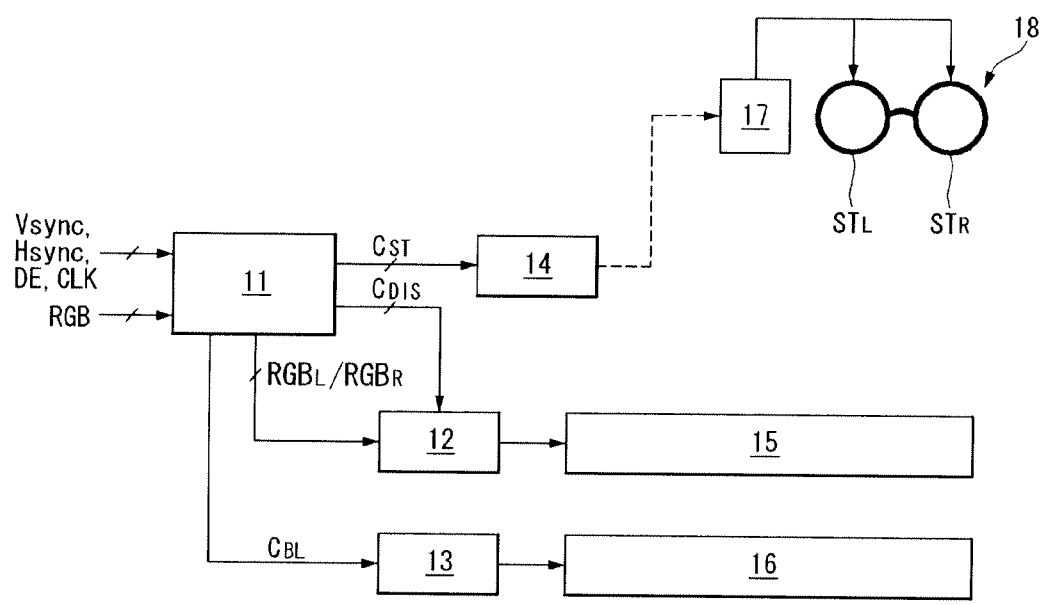
FIG. 3 is a schematic block diagram of a stereoscopic image display according to an exemplary embodiment of the invention.

As shown in FIG. 3, a stereoscopic image display according to an exemplary embodiment of the invention includes a display panel 15, a backlight unit 16, liquid crystal shutter glasses 18, a controller 11, a display panel driving circuit 12, a backlight driving circuit 13, a liquid crystal shutter control signal transmission unit 14, and a liquid crystal shutter control signal reception unit 17.

The display panel 15 alternately displays left eye image data $RGB_L$ and right eye image data $RGB_R$ under the control of the controller 11. The display panel 15 may display black data between the left eye image data $RGB_L$ and the right eye image data $RGB_R$ under the control of the controller 11. The display panel 15 may be selected as a hold type display device requiring a backlight unit. The hold type display device may be selected as a backlit liquid crystal display panel modulating light from the backlight unit 16.

The backlit liquid crystal display panel includes a thin film transistor (TFT) substrate and a color filter substrate. A liquid crystal layer is formed between the TFT substrate and the color filter substrate. On the TFT substrate, data lines and gate lines (or scan lines) are formed to cross each other on a lower glass substrate, and liquid crystal cells are disposed in a matrix form in cell areas defined by the data lines and the gate lines. TFTs formed at crossings of the data lines and the gate lines transfer a data voltage supplied via the data lines to pixel electrodes of the liquid crystal cells in response to scan pulses from the gate lines. To this end, a gate electrode of each TFT is connected to the gate line, and a source electrode of each TFT is connected to the data line. A drain electrode of each TFT is connected to the pixel electrode of the liquid crystal cell. A common voltage is applied to a common electrode facing the pixel electrode. The color filter substrate includes black matrixes and color filters formed on an upper glass substrate. In a vertical field driving mode such as a twisted nematic (TN) mode and a vertical alignment (VA) mode, the common electrode is formed on the upper glass substrate. In a horizontal field driving mode such as an in-plane switching (IPS) mode and a fringe field switching (FFS) mode, the common electrode is formed along with the pixel electrodes on the lower glass substrate. Polarizing plates are respectively attached to the upper and lower glass substrates of the backlit liquid crystal display panel, and alignment layers for setting a pre-tilt angle of liquid crystals are respectively formed on the upper and lower glass substrates. A spacer is formed between the upper and lower glass substrates of the backlit liquid crystal display panel to maintain a cell gap of the liquid crystal layer. The backlit liquid crystal display panel may be implemented in any liquid crystal mode as well as the TN, VA, IPS, and FFS modes.

The display panel driving circuit 12 includes a data driving circuit and a gate driving circuit. The data driving circuit converts left eye image data and right eye image data input from the controller 11 into positive and negative gamma compensation voltages to generate positive and negative analog data voltages. The positive and negative analog data voltages output from the data driving circuit are supplied to the data lines of the display panel 15. The gate driving circuit sequentially supplies a gate pulse (or a scan pulse) synchronized with the data voltage to the gate lines of the display panel 15.

The backlight unit 16 is turned on for a predetermined period of time to irradiate light to the display panel 15 and is turned off for other period of time. The backlight unit 16 is repeatedly turned on and off periodically. The backlight unit 16 includes a light source turned on in accordance with driving power supplied from the backlight driving circuit 13, a light guide plate (or diffusion plate), a plurality of optical sheets, and the like. The backlight unit 16 may be implemented as one of a direct type backlight unit and an edge type backlight unit. The light source of the backlight unit 16 may include one or two or more of a hot cathode fluorescent lamp (HCFL), a cold cathode fluorescent lamp (CCFL), an external electrode fluorescent lamp (EEFL), and a light emitting diode (LED).

The backlight driving circuit 13 generates driving power for turning on the light source. The backlight driving circuit 13 periodically turns on and off the driving power supplied to the light source under the control of the controller 11.

The liquid crystal shutter glasses 18 include a left eye shutter $ST_L$ and a right eye shutter $ST_R$ which are separately controlled electrically. Each of the left eye shutter $ST_L$ and the right eye shutter $ST_R$ includes a first transparent substrate, a first transparent electrode formed on the first transparent substrate, a second transparent substrate, a second transparent electrode formed on the second transparent substrate, and a liquid crystal layer interposed between the first and second transparent substrates. A reference voltage is supplied to the first transparent electrode, and ON and OFF voltages are supplied to the second transparent electrode. When the ON voltage is supplied to the second transparent electrode of each of the left and right eye shutters $ST_L$ and $ST_R$, each of the left and right eye shutters $ST_L$ and $ST_R$ transmits light from the display panel 15. On the other hand, when the OFF voltage is supplied to the second transparent electrode of each of the left and right eye shutters $ST_L$ and $ST_R$, each of the left and right eye shutters $ST_L$ and $ST_R$ excludes light from the display panel 15.

The liquid crystal shutter control signal transmission unit 14 is connected to the controller 11 and transmits a liquid crystal shutter control signal $C_{ST}$ input from the controller 11 to the liquid crystal shutter control signal reception unit 17 through a wireline/wireless interface. The liquid crystal shutter control signal reception unit 17 is installed in the liquid crystal shutter glasses 18 and receives the liquid crystal shutter control signal $C_{ST}$ through the wireline/wireless interface. The liquid crystal shutter control signal reception unit 17 alternately opens and closes the left and right eye shutters $ST_L$ and $ST_R$ of the liquid crystal shutter glasses 18 in response to the liquid crystal shutter control signal $C_{ST}$. When the liquid crystal shutter control signal $C_{ST}$ of a first logic value is input to the liquid crystal shutter control signal reception unit 17, the ON voltage is supplied to the second transparent electrode of the left eye shutter $ST_L$ while the OFF voltage is supplied to the second transparent electrode of the right eye shutter $ST_R$. When the liquid crystal shutter control signal $C_{ST}$ of a second logic value is input to the liquid crystal shutter control signal reception unit 17, the OFF voltage is supplied to the second transparent electrode of the left eye shutter $ST_L$ while the ON voltage is supplied to the second transparent electrode of the right eye shutter $ST_R$. Accordingly, the left eye shutter $ST_L$ of the liquid crystal shutter glasses 18 is open when the liquid crystal shutter control signal $C_{ST}$ of the first logic value is generated, and the right eye shutter $ST_R$ of the liquid crystal shutter glasses 18 is open when the liquid crystal shutter control signal $C_{ST}$ of the second logic value is generated. In the embodiment of the invention, the first logic value may be set to a high logic voltage and the second logic value may be set to may be set to a low logic voltage.

The controller 11 receives timing signals and digital video data RGB from a video source (not shown). The timing signals include a vertical synchronous signal Vsync, a horizontal synchronous signal Hsync, a data enable signal DE, a dot clock CLK, and the like.

Figure 5:
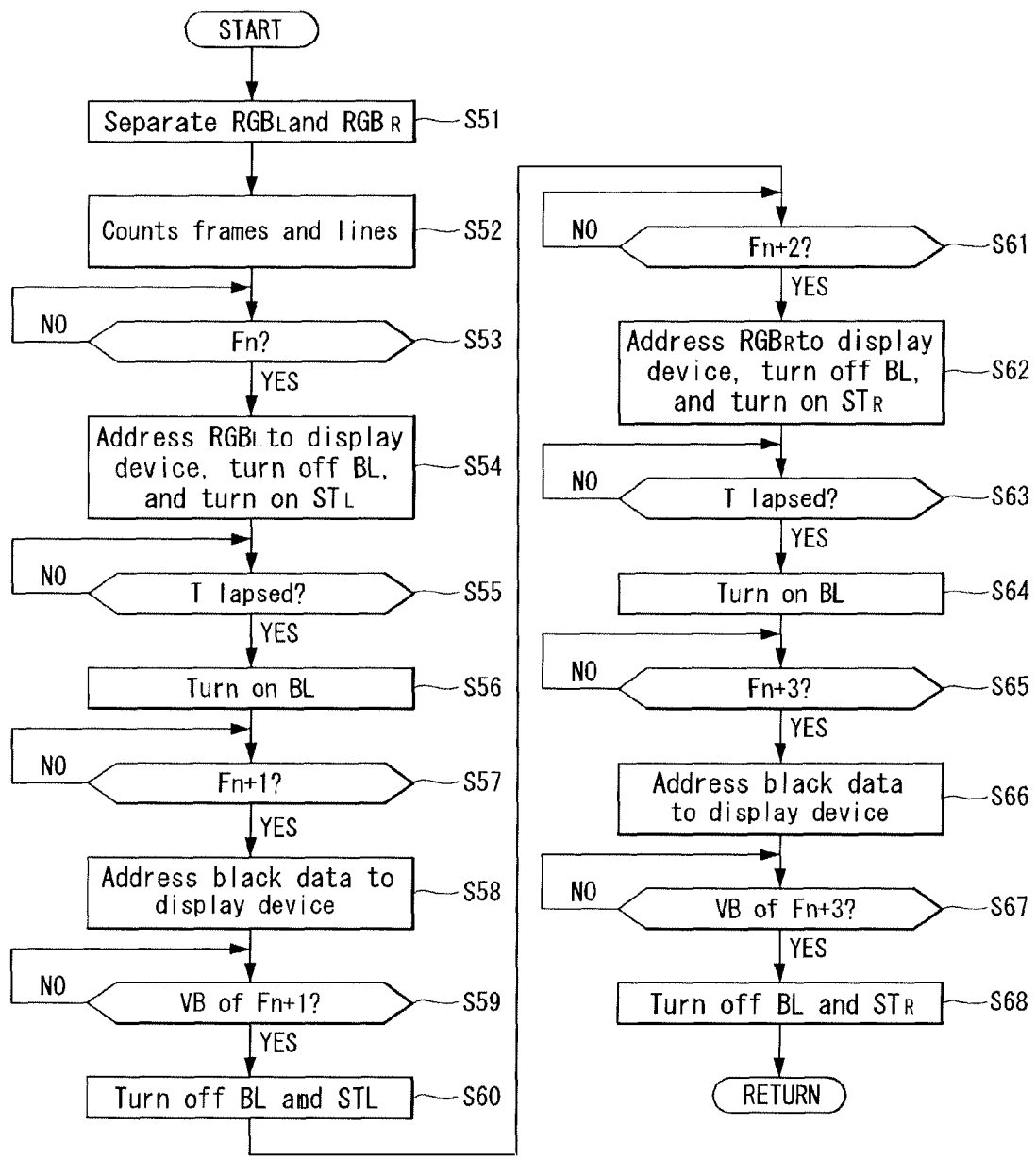
FIG. 5 is a flow chart illustrating a method of driving a stereoscopic image display according to a first exemplary embodiment of the invention.
Figure 6:
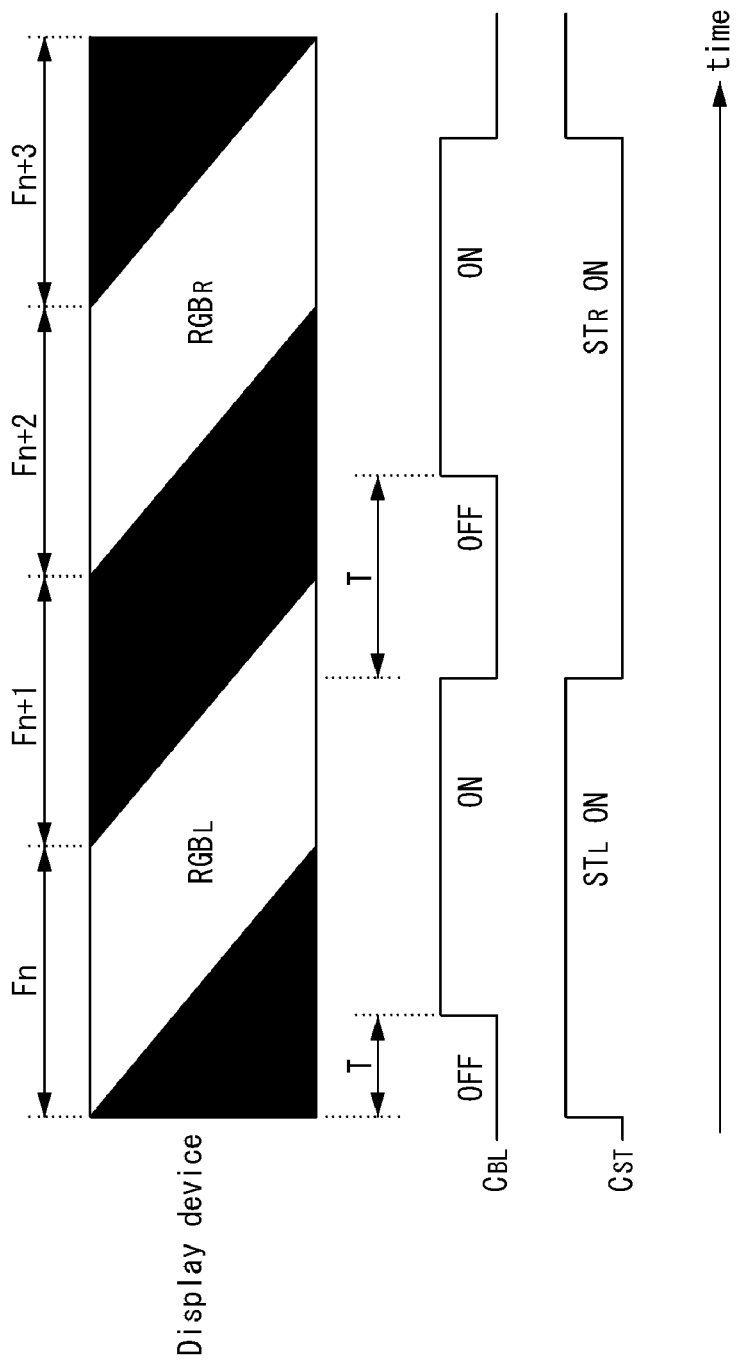
FIG. 6 is a waveform diagram illustrating a driving waveform of the stereoscopic image display according to the first exemplary embodiment of the invention.
Figure 7:
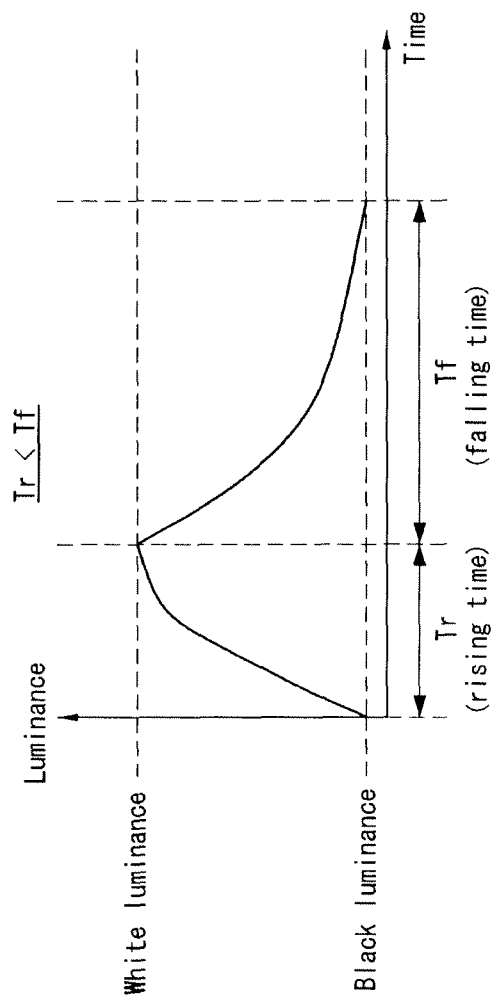
FIG. 7 illustrates response characteristic of liquid crystals with a long falling time.
Figure 8:
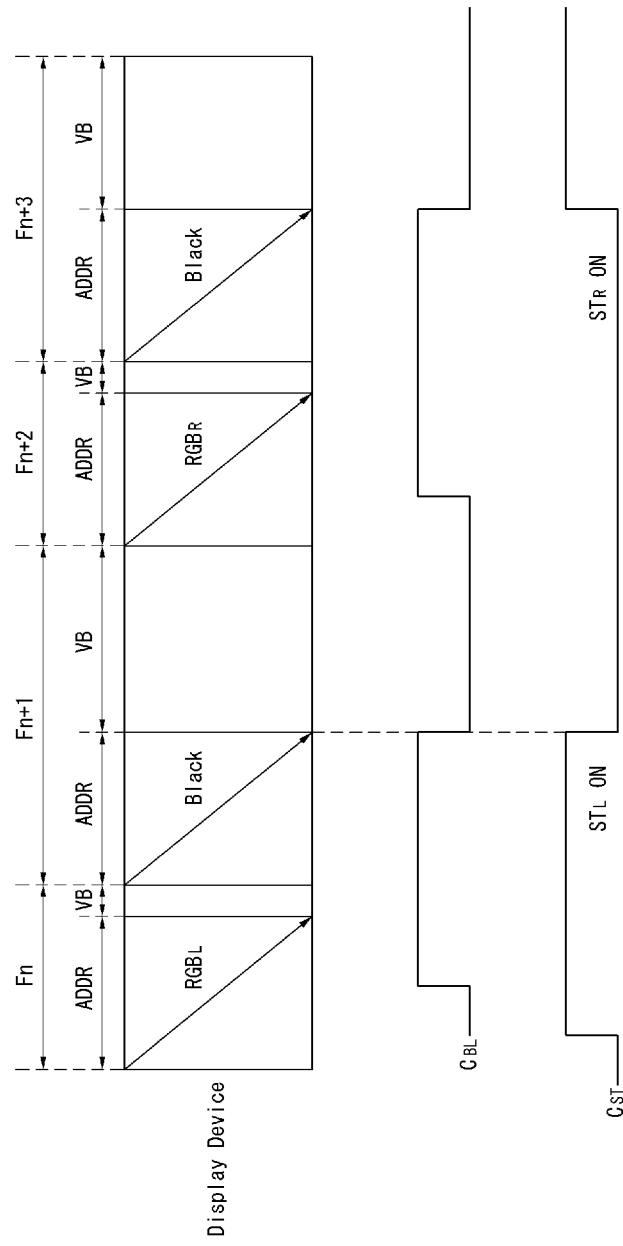
FIG. 8 is a waveform diagram illustrating an example of extending a vertical blanking period of a frame period during which black data is addressed in the response characteristic of the liquid crystals illustrated in FIG. 7.

In a first exemplary embodiment of the invention, the controller 11 may insert a frame period, during which black data is addressed, behind each of the left and right eye image data $RGB_L$ and $RGB_R$ in accordance with a data sequence illustrated in FIGS. 5 and 6. When a falling time Tf is longer than a rising time Tr in response characteristic of the liquid crystals as shown in FIG. 7, the controller 11 controls so that a duration of a vertical blanking period of a frame period during which the black data is displayed is longer than a duration of a vertical blanking period of a frame period, during which the left and right eye image data $RGB_L$ and $RGB_R$ are displayed, as shown in FIG. 8.

In a second exemplary embodiment of the invention, as shown in FIGS. 9 to 11C, the controller 11 may continuously output left eye image data $RGB_L(HG)$ and $RGB_L(LG)$, each of which is modulated based on a different gamma characteristic, during N frame periods (where, N is an integer equal to or greater than 2), and then may continuously output right eye image data $RGB_R(HG)$ and $RGB_R(LG)$, each of which is modulated based on a different gamma characteristic, during N frame periods following the N frame periods. When the falling time Tf is longer than the rising time Tr in the response characteristic of the liquid crystals as shown in FIG. 7, the controller 11 controls so that a vertical blanking period of a frame period during which the left and right eye image data $RGB_L(LG)$ and $RGB_R(LG)$ of a low gamma characteristic are addressed is longer than a vertical blanking period of a frame period, during which the left and right eye image data $RGB_L$ (HG) and $RGB_R$(HG) of a high gamma characteristic are addressed, as shown in FIG. 12.

Figure 13:
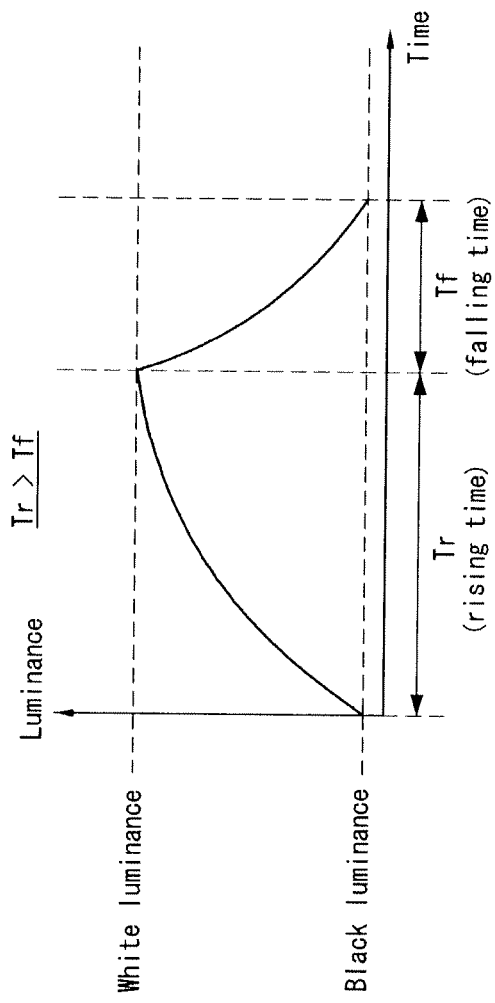
FIG. 13 illustrates response characteristic of liquid crystals with a long rising time.
Figure 14:
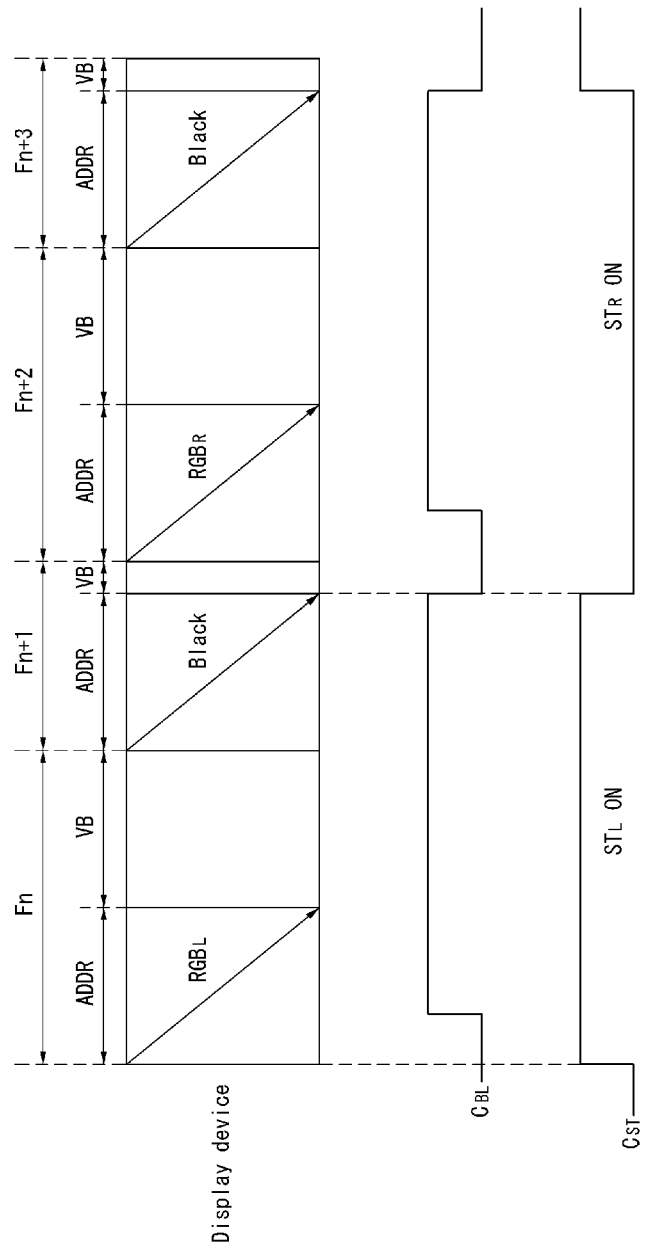
FIG. 14 is a waveform diagram illustrating an example of extending a vertical blanking period of a frame period during which left and right eye image data is addressed in the response characteristic of the liquid crystals illustrated in FIG. 13.

In a third exemplary embodiment of the invention, when the rising time Tr is longer than the falling time Tf in the response characteristic of the liquid crystals as shown in FIG. 13, the controller 11 controls so that a vertical blanking period of a frame period, during which the left and right eye image data $RGB_L$ and $RGB_R$ are displayed is longer than a vertical blanking period of a frame period during which the black data is displayed, as shown in FIG. 14.

Figure 15:
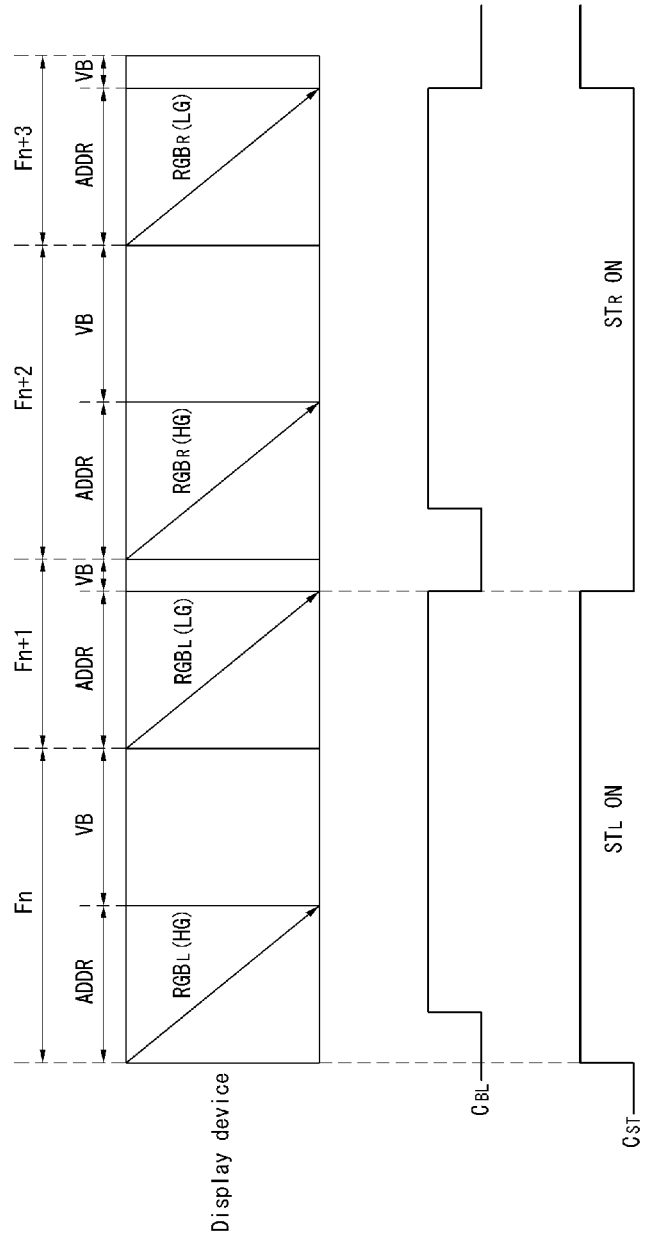
FIG. 15 is a waveform diagram illustrating an example of extending a vertical blanking period of a frame period during which left and right eye image data of high gamma characteristic is addressed in the response characteristic of the liquid crystals illustrated in FIG. 13.

In a fourth exemplary embodiment of the invention, when the rising time Tr is longer than the falling time Tf in the response characteristic of the liquid crystals as shown in FIG. 13, the controller 11 controls so that a vertical blanking period of a frame period during which the left and right eye image data $RGB_L$(HG) and $RGB_R$(HG) of the high gamma characteristic are addressed is longer than a vertical blanking period of a frame period, during which the left and right eye image data $RGB_L$(LG) and $RGB_R$(LG) of the low gamma characteristic are addressed, as shown in FIG. 15.

Figure 16:
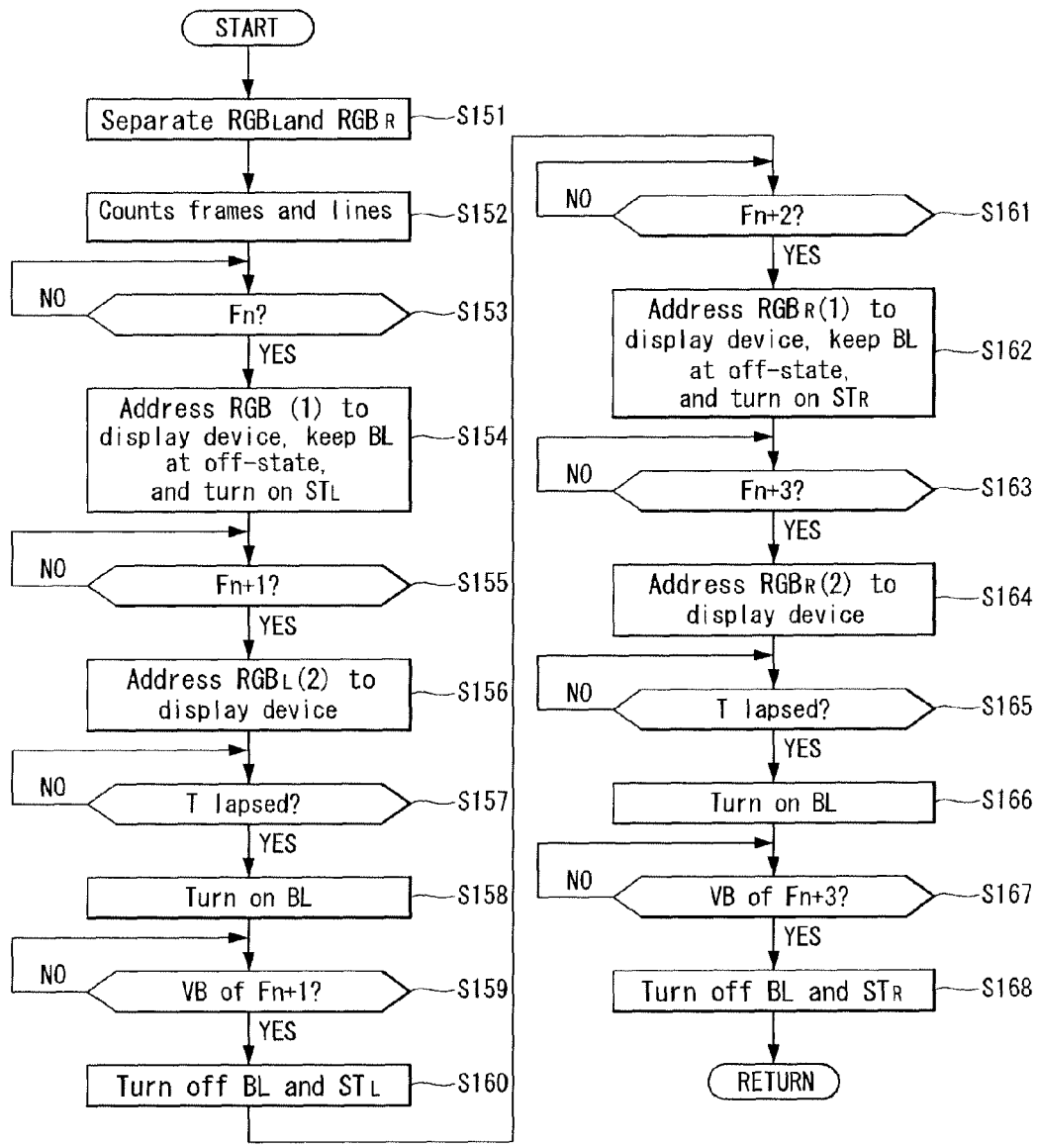
FIG. 16 is a flow chart illustrating a method of driving a stereoscopic image display according to a third exemplary embodiment of the invention.
Figure 17:
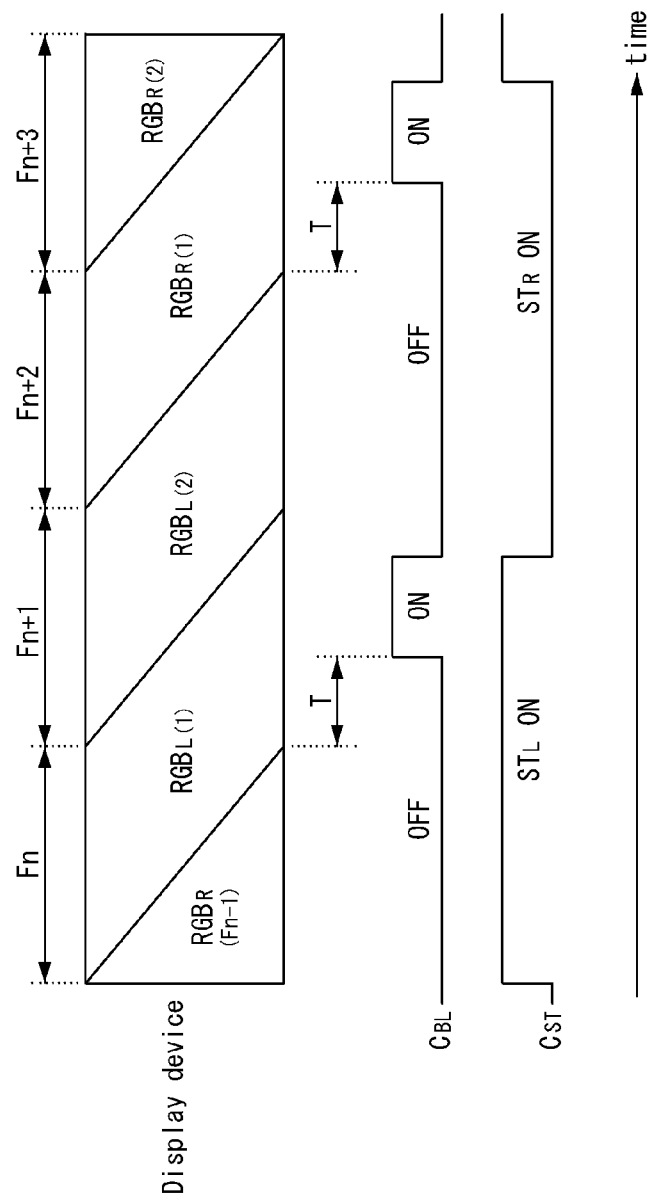
FIG. 17 is a waveform diagram illustrating a driving waveform of the stereoscopic image display according to the third exemplary embodiment of the invention.
Figure 18:
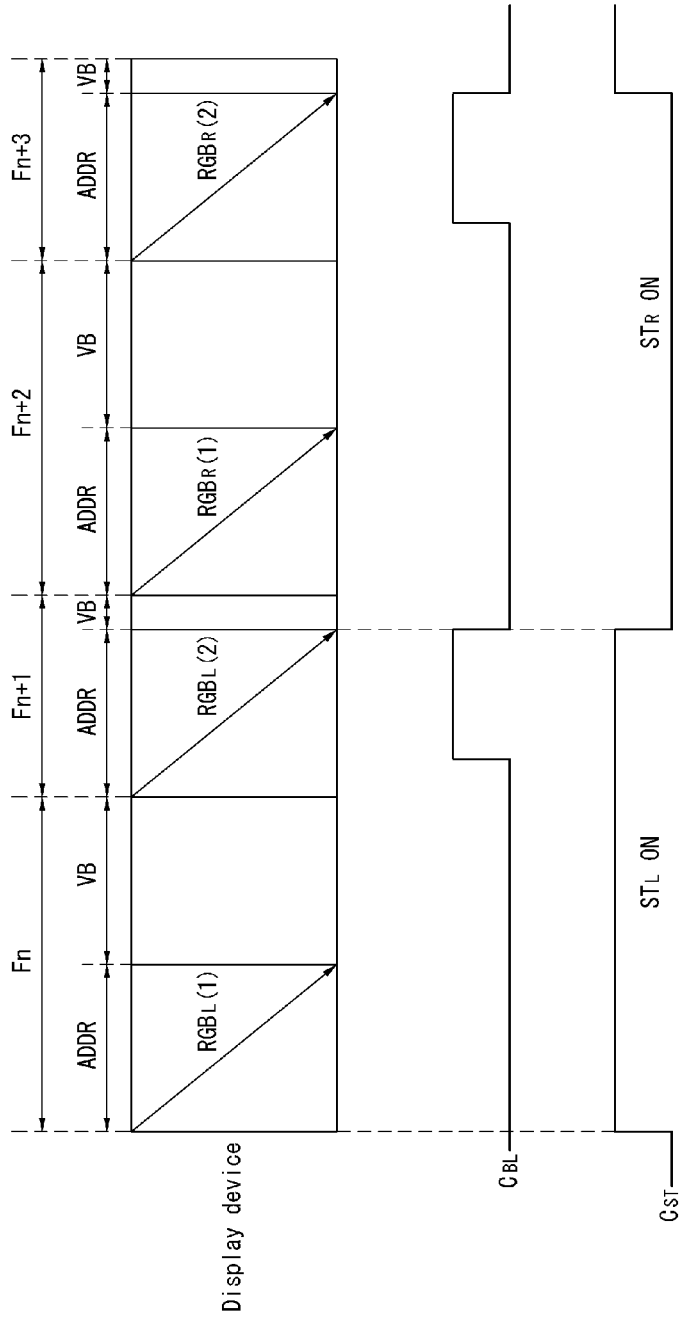
FIG. 18 is a waveform diagram illustrating an example of extending a vertical blanking period of a first frame period among left and right eye image data continued during N frame periods so as to obtain an overdriving compensation effect.

In a fifth exemplary embodiment of the invention, as shown in FIGS. 16 and 17, the controller 11 may continuously output the same left eye image data $RGB_L$ during N frame periods, and then may continuously output the same right eye image data $RGB_R$ during N frame periods following the N frame periods. As shown in FIG. 18, the controller 11 controls so that a vertical blanking period of a frame period during which first left and right eye image data $RGB_L(1)$ and $RGB_R(1)$ are displayed is longer than a vertical blanking period of a frame period during which second left and right eye image data $RGB_L(2)$ and $RGB_R(2)$ are displayed.

The controller 11 multiplies a frame frequency by N times, preferably, by four or more times, the input frame frequency, and generates a display panel control signal $C_{DIS}$, a backlight control signal $C_{BL}$, and the liquid crystal shutter control signal $C_{ST}$ based on the multiplied frame frequency. The input frame frequency is 50 Hz in a phase alternate line (PAL) scheme and 60 Hz in a national television standards committee (NTSC) scheme. Accordingly, when multiplying the input frame frequency by four times, the controller 11 multiplies the frequency of the display panel control signal $C_{DIS}$, the frequency of the backlight control signal $C_{BL}$, and the frequency of the liquid crystal shutter control signal $C_{ST}$ based on the frame frequency of 200 Hz or higher. When the frame frequency is 200 Hz, one frame period is about 5 msec, and when the frame frequency is 240 Hz, one frame period is about 4.16 msec.

The display panel control signal $C_{DIS}$ includes a data control signal for controlling an operation timing of the data driving circuit and a gate control signal for controlling an operation timing of the gate driving circuit. The data control signal includes a source start pulse SSP, a source sampling clock SSC, a source output enable signal SOE, a polarity control signal POL, and the like. The source start pulse SSP controls a data sampling start time point of the data driving circuit. The source sampling clock SSC is a clock signal for controlling a sampling operation of the data driving circuit based on a rising edge or a falling edge. If digital video data to be input to the data driving circuit is transmitted based on a mini low voltage differential signaling (LVDS) interface standard, the source start pulse SSP and the source sampling clock SSC may be omitted. The polarity control signal POL inverts the polarity of the data voltage output from the data driving circuit every n horizontal periods, where n is a positive integer. The source output enable signal SOE controls an output timing of the data driving circuit. The gate control signal includes a gate start pulse GSP, a gate shift clock GSC, a gate output enable signal GOE, and the like. The gate start pulse GSP controls a timing of a first gate pulse. The gate shift clock GSC is a clock signal for shifting the gate start pulse GSP. The gate output enable signal GOE controls an output timing of the gate driving circuit.

The backlight control signal $C_{BL}$ controls the backlight driving circuit 13 to periodically turn on and off the light source of the backlight unit 16 as shown in FIGS. 5 to 18. The liquid crystal shutter control signal $C_{ST}$ is transmitted to the liquid crystal shutter control signal transmission unit 14 to alternately open and close the left eye shutter $ST_L$ and the right eye shutter $ST_R$ of the liquid crystal shutter glasses 18.

Figure 4:
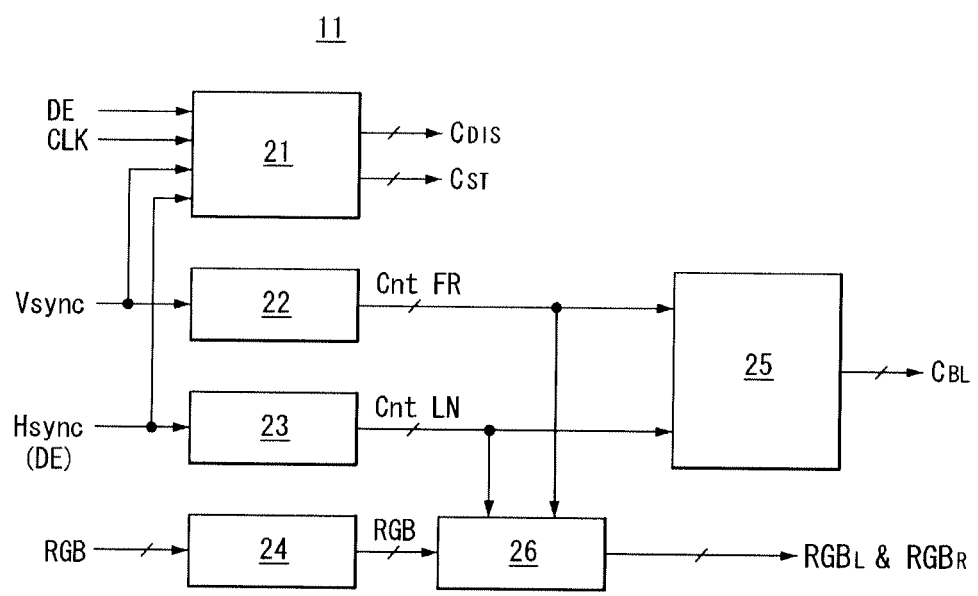
FIG. 4 is a detailed block diagram of a controller in FIG. 3.

FIG. 4 is a detailed view of the controller 11. As shown in FIG. 4, the controller 11 includes a first control signal generating unit 21, a frame counter 22, a line counter 23, a second control signal generating unit 25, a memory 24, and a data separating unit 26.

As shown in FIGS. 5 to 18, the first control signal generating unit 21 generates the display panel control signal $C_{DIS}$ and the liquid crystal shutter control signal $C_{ST}$ using the timing signals input from the video source. The first control signal generating unit 21 outputs the display panel control signal $C_{DIS}$, so that data is written on the display panel 15 during an address period ADDR shown in FIGS. 8, 12, 14, 15, and 18. On the other hand, the first control signal generating unit 21 does not output the display panel control signal $C_{DIS}$ during a vertical blanking period VB in which there is no data.

The frame counter 22 counts a signal, for example, the vertical synchronous signal Vsync or the gate start pulse GSP having a pulse generated once during 1 vertical period (or 1 frame period) to generate a frame count signal Cnt_FR. The line counter 23 counts a signal, for example, the horizontal synchronous signal Hsync or the data enable signal DE having a pulse generated once during 1 horizontal period to generate a line count signal Cnt_LN.

The second control signal generating unit 25 receives the frame count signal Cnt_FR and the line count signal Cnt_LN to generate the backlight control signal $C_{BL}$ as shown in FIGS. 5 to 10.

The memory 24 temporarily stores the input digital video data RGB. The left eye image data $RGB_L$ and the right eye image data $RGB_R$ may be alternately encoded to the input digital video data RGB every 1 frame period. When the left eye image data $RGB_L$ and the right eye image data $RGB_R$ are alternately encoded to the input digital video data RGB every 1 frame period, the memory 24 is selected as a frame memory. Meanwhile, the left eye image data $RGB_L$ and the right eye image data $RGB_R$ may be alternately encoded to the input digital video data RGB every 1 line. When the left eye image data $RGB_L$ and the right eye image data $RGB_R$ are alternately encoded to the input digital video data RGB every 1 line, the memory 24 may be selected as a line memory.

The data separating unit 26 rearranges the digital video data RGB input from the memory 24 and separates the left eye image data $RGB_L$ and the right eye image data $RGB_R$. The data separating unit 26 transmits the left eye image data $RGB_L$ and the right eye image data $RGB_R$ in accordance with the data sequence illustrated in FIGS. 5 to 18. The data separating unit 26 may insert the black data behind each of the left and right eye image data $RGB_L$ and $RGB_R$. In addition, the data separating unit 26 may differently convert gamma characteristics of the left eye image data $RGB_L$ every 1 frame period, and may differently convert gamma characteristics of the right eye image data $RGB_R$ sequential to the left eye image data $RGB_L$ every 1 frame period. The data separating unit 26 outputs data during the address period ADDR shown in FIGS. 8, 12, 14, 15, and 18, but does not output data during the vertical blanking period VB.

Figure 9:
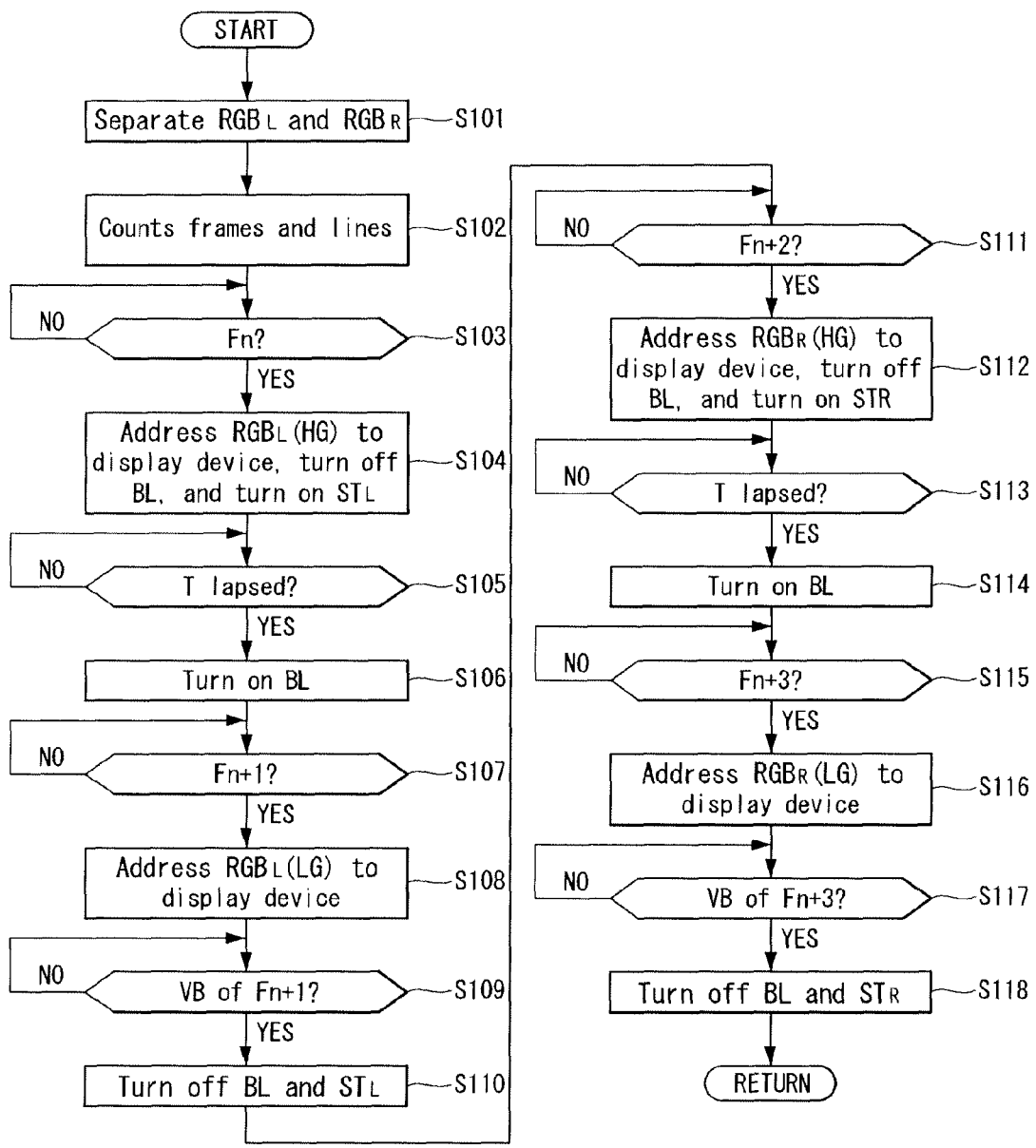
FIG. 9 is a flow chart illustrating a method of driving a stereoscopic image display according to a second exemplary embodiment of the invention.

Various methods of driving the stereoscopic image display according to the exemplary embodiments of the invention are described below with reference to FIGS. 5 to 18. In FIGS. 5, 7, and 9, 'Br' denotes the backlight unit 16, and '$ST_L$' and '$ST_R$' denote the left eye shutter and the right eye shutter of the liquid crystal shutter glasses 18, respectively.

FIG. 5 is a flow chart illustrating a method of driving the stereoscopic image display according to the first exemplary embodiment of the invention. FIG. 6 is a waveform diagram illustrating a driving waveform of the stereoscopic image display according to the first exemplary embodiment of the invention. The first exemplary embodiment will be described in detail in association with the stereoscopic image display illustrated in FIGS. 3 and 4.

As shown in FIGS. 5 and 6, the controller 11 separates the left eye image data $RGB_L$ and the right eye image data $RGB_R$ from the input digital video data RGB using the memory 24 in step S51.

One frame period is divided into the address period ADDR during which data is addressed by the display device and the vertical blanking period VB during which there is no data. The controller 11 may determine the address period ADDR and the vertical blanking period VB in each frame period based on the frame count and the line count, and also may determine turn-on time and turn-off time of the backlight unit 16 in step S52.

The controller 11 generates the display panel control signal $C_{DIS}$ during an address period ADDR of an nth frame period Fn. During the address period ADDR of the nth frame period Fn, the controller 11 supplies the left eye image data $RGB_L$ to the data driving circuit and generates the liquid crystal shutter control signal $C_{ST}$ of a high logic level. During the address period ADDR of the nth frame period Fn, the data driving circuit supplies the data voltage of the left eye image data $RGB_L$ to the data lines of the display panel 15 and addresses the left eye image data $RGB_L$ to the pixels of the display panel 15. The liquid crystal shutter control signal reception unit 17 opens the left eye shutter $ST_L$ and shuts the right eye shutter $ST_R$ in response to the liquid crystal shutter control signal $C_{ST}$ of the high logic level during the nth frame period Fn in steps S53 and S54.

The controller 11 keeps the backlight control signal $C_{BL}$ at a low logic level during a predetermined time period T ranging from a start time point of the nth frame period Fn to a predetermined time point. The controller 11 then converts the backlight control signal $C_{BL}$ from the low logic level to a high low logic level. The predetermined time period T may be determined depending on a line count value within a time period larger than 0 and shorter than one frame period and may be determined to be a certain time following a response time of the liquid crystals. The backlight driving circuit 13 turns on the light source of the backlight unit 16 at a time point when the predetermined time period T has elapsed from the start time point of the nth frame period Fn in response to the backlight control signal $C_{BL}$ of the high logic level in steps S55 and S56.

The controller 11 generates the display panel control signal $C_{DIS}$ during an address period ADDR of an (n+1)th frame period Fn+1, repeatedly supplies black data (for example, digital data "0000 0000") stored in a register to the data driving circuit, and keeps the liquid crystal shutter control signal $C_{ST}$ at the high logic level in steps S57 and S58. During the address period ADDR of the (n+1)th frame period Fn+1, the data driving circuit supplies the data voltage of the black data to the data lines of the display panel 15 and addresses the black data to the pixels of the display panel 15. The backlight driving circuit 13 turns on the light source of the backlight unit 16 in response to the backlight control signal $C_{BL}$ of the high logic level during the (n+1)th frame period Fn+1. The liquid crystal shutter control signal reception unit 17 opens the left eye shutter $ST_L$ and shuts the right eye shutter $ST_R$ in response to the liquid crystal shutter control signal $C_{ST}$ of the high logic level during the (n+1)th frame period Fn+1.

During a vertical blanking period VB of the (n+1)th frame period Fn+1, the controller 11 converts the backlight control signal $C_{BL}$ from the high logic level to a low logic level and then converts the liquid crystal shutter control signal $C_{ST}$ from the high logic level to a low logic level.

The backlight driving circuit 13 turns off the light source of the backlight unit 16 in response to the backlight control signal $C_{BL}$ of the low logic level during the vertical blanking period VB of the (n+1)th frame period Fn+1. The liquid crystal shutter control signal reception unit 17 shuts the left eye shutter $ST_L$ and opens the right eye shutter $ST_R$ in response to the liquid crystal shutter control signal $C_{ST}$ of the low logic level during the vertical blanking period VB of the (n+1)th frame period Fn+1 in steps S59 and S60.

The controller 11 generates the display panel control signal $C_{DIS}$ during an address period ADDR of an (n+2)th frame period Fn+2. During the address period ADDR of the (n+2)th frame period Fn+2, the controller 11 supplies the right eye image data $RGB_R$ to the data driving circuit and generates the liquid crystal shutter control signal $C_{ST}$ of a low logic level. During the address period ADDR of the (n+2)th frame period Fn+2, the data driving circuit supplies the data voltage of the right eye image data $RGB_R$ to the data lines of the display panel 15 and addresses the right eye image data $RGB_R$ to the pixels of the display panel 15. The liquid crystal shutter control signal reception unit 17 shuts the left eye shutter $ST_L$ and opens the right eye shutter $ST_R$ in response to the liquid crystal shutter control signal $C_{ST}$ of the low logic level during the (n+2)th frame period Fn+2 in steps S61 and S62.

The controller 11 generates the backlight control signal $C_{BL}$ of the low logic level at a start time point of the (n+2)th frame period Fn+2 and then converts the backlight control signal $C_{BL}$ from the low logic level to the high logic level at a time point when the predetermined time period T has elapsed from the start time point of the (n+2)th frame period Fn+2. The backlight driving circuit 13 turns on the light source of the backlight unit 16 at a time point when the predetermined time period T has elapsed from the start time point of the (n+2)th frame period Fn+2 in response to the backlight control signal $C_{BL}$ of the high logic level in steps S63 and S64.

The controller 11 generates the display panel control signal $C_{DIS}$ during an address period ADDR of an (n+3)th frame period Fn+3, repeatedly supplies the black data stored in a register to the data driving circuit, and keeps the liquid crystal shutter control signal $C_{ST}$ at the low logic level in steps S65 and S66. During the address period ADDR of the (n+3)th frame period Fn+3, the data driving circuit supplies the data voltage of the black data to the data lines of the display panel 15 and addresses the black data to the pixels of the display panel 15. The backlight driving circuit 13 turns on the light source of the backlight unit 16 in response to the backlight control signal $C_{BL}$ of the high logic level during the (n+3)th frame period Fn+3. The liquid crystal shutter control signal reception unit 17 shuts the left eye shutter $ST_L$ and opens the right eye shutter $ST_R$ in response to the liquid crystal shutter control signal $C_{ST}$ of the low logic level during the (n+3)th frame period Fn+3.

During a vertical blanking period VB of the (n+3)th frame period Fn+3, the controller 11 converts the backlight control signal $C_{BL}$ to the low logic level and then converts the liquid crystal shutter control signal $C_{ST}$ to the high logic level in steps S67 and S68. The backlight driving circuit 13 turns off the light source of the backlight unit 16 in response to the backlight control signal $C_{BL}$ of the low logic level during the vertical blanking period VB of the (n+3)th frame period Fn+3. The liquid crystal shutter control signal reception unit 17 opens the left eye shutter $ST_L$ and shuts the right eye shutter $ST_R$ in response to the liquid crystal shutter control signal $C_{ST}$ of the high logic level during the vertical blanking period VB of the (n+3)th frame period Fn+3.

The response characteristic of the liquid crystals may be determined by a rising time $\tau_r$ and a falling time $\tau_f$ defined by the following Equations 1 and 2.

$$\tau_r \propto \frac{\gamma d^2}{\Delta\varepsilon |V_a^2 - V_F^2|} \qquad \text{[Equation 1]}$$

In Equation 1, "$V_F$" indicates a Freederick transition voltage when liquid crystal molecules start a slope movement, "d" indicates a cell gap between the liquid crystal cells, "Γ (gamma)" indicates a rotational viscosity of the liquid crystal molecule.

$$\tau_f \propto \frac{\gamma d^2}{K} \qquad \text{[Equation 2]}$$

In Equation 2, "K" indicates modulus of elasticity of the liquid crystal.

In the response characteristic of the liquid crystals, the rising time $\tau_r$ of the liquid crystals may be greater than the falling time $\tau_f$ of the liquid crystals. In this case, if a duration of a frame period during which the black data is addressed is short, the liquid crystal cells may be insufficiently charged to the black data during the short frame period. Hence, image sticking may appear. In particular, when the frame frequency is equal to or greater than 200 Hz, a black data charge time of the liquid crystal cells because of a short duration of a frame period is insufficient.

In the first exemplary embodiment of the invention, as shown in FIG. 8, the controller 11 controls so that the durations of the vertical blanking periods VB of the frame periods Fn+1 and Fn+3 during which the black data is addressed are longer than the durations of the vertical blanking periods VB of the frame periods Fn and Fn+2 during which the left and right eye image data $RGB_L$ and $RGB_R$ are addressed. One frame period is about 4.16 msec at the frame frequency of 240 Hz. In this case, the address period ADDR of each of the frame periods Fn and Fn+2 during which the left and right eye image data $RGB_L$ and $RGB_R$ are addressed may be controlled to be equal to or less than about 4 msec, and the vertical blanking period VB of each of the frame periods Fn and Fn+2 may be controlled to be equal to or less than about 0.167 msec. On the contrary, the address period ADDR of each of the frame periods Fn+1 and Fn+3 during which the black data is addressed may be controlled to be equal to or less than about 4 msec, and the vertical blanking period VB of each of the frame periods Fn+1 and Fn+3 may be long controlled to be equal to or greater than about 1.833 msec.

Figure 10:
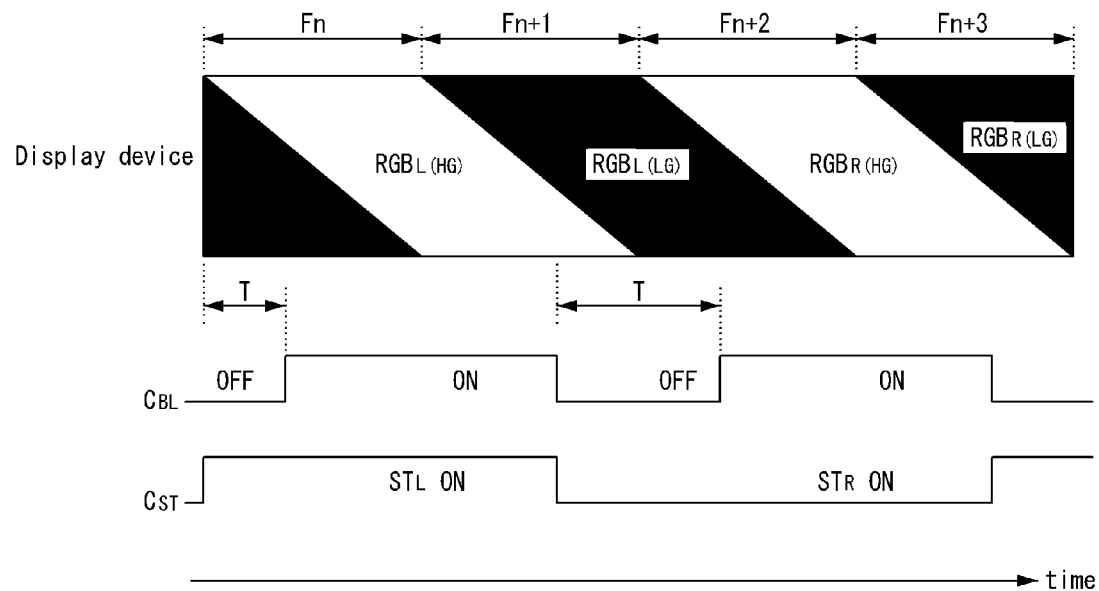
FIG. 10 is a waveform diagram illustrating a driving waveform of the stereoscopic image display according to the second exemplary embodiment of the invention.

FIG. 9 is a flow chart illustrating a method of driving the stereoscopic image display according to the second exemplary embodiment of the invention. FIG. 10 is a waveform diagram illustrating a driving waveform of the stereoscopic image display according to the second exemplary embodiment of the invention. The second exemplary embodiment will be described in detail in association with the stereoscopic image display illustrated in FIGS. 3 and 4.

As shown in FIGS. 9 and 10, the controller 11 separates the left eye image data $RGB_L$ and the right eye image data $RGB_R$ from the input digital video data RGB and counts frame periods and lines in steps S101 and S102.

The controller 11 generates the display panel control signal $C_{DIS}$ during an address period ADDR of an nth frame period Fn. During the address period ADDR of the nth frame period Fn, the controller 11 supplies left eye image data $RGB_L$(HG), which is modulated based on a high gamma characteristic illustrated in FIG. 11B, to the data driving circuit and generates the liquid crystal shutter control signal $C_{ST}$ of a high logic level.

Figure 11A:
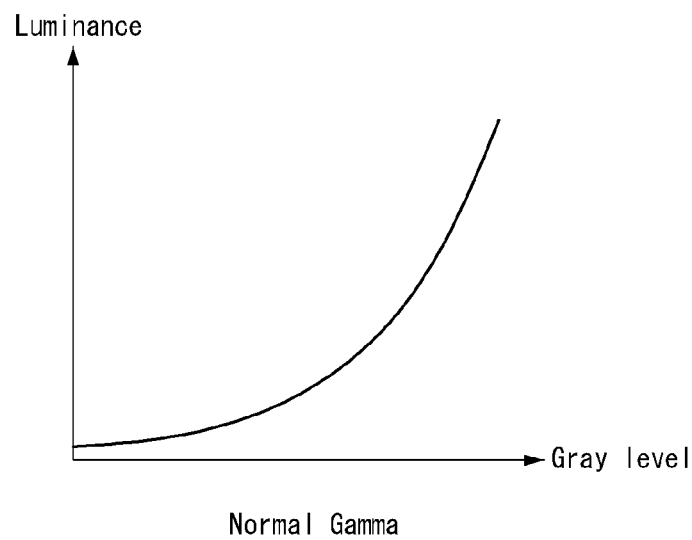
FIGS. 11A to 11C are graphs showing a normal gamma characteristic curve, a high gamma characteristic curve, and a low gamma characteristic curve.
Figure 11B:
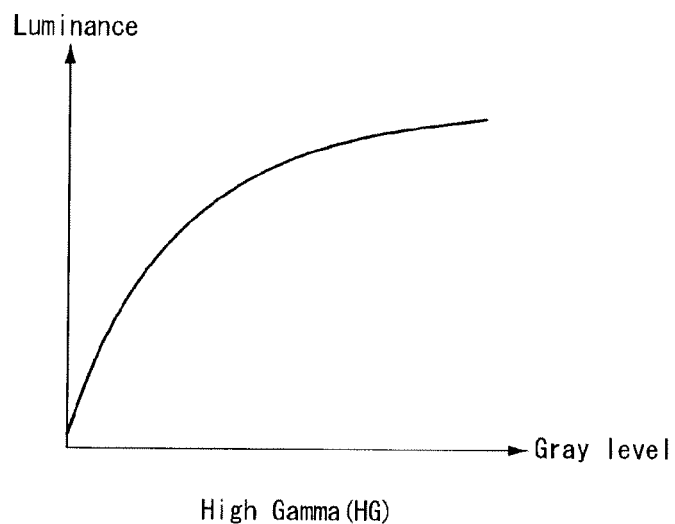
Figure 12:
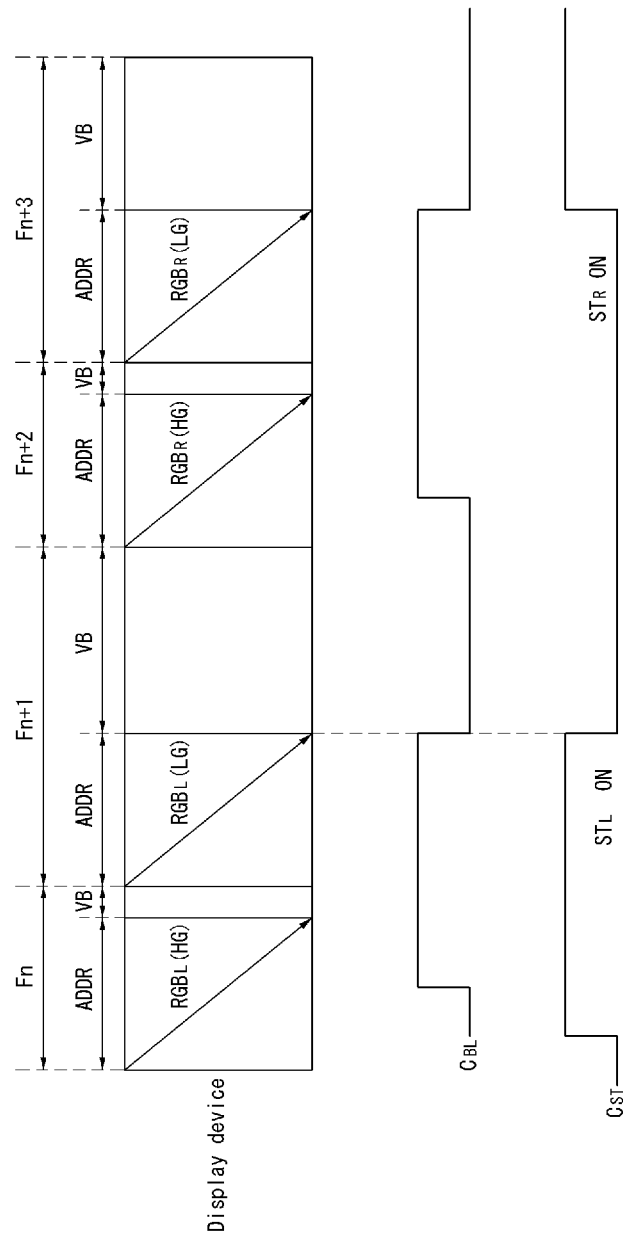
FIG. 12 is a waveform diagram illustrating an example of extending a vertical blanking period of a frame period during which left and right eye image data of low gamma characteristic is addressed in the response characteristic of the liquid crystals illustrated in FIG. 7.

The left eye image data $RGB_L$(HG) of the high gamma characteristic illustrated in FIG. 11B increases a display luminance at a low gray level and a middle gray level, compared with a normal gamma characteristic illustrated in FIG. 11A. During the address period ADDR of the nth frame period Fn, the data driving circuit supplies the data voltage of the left eye image data $RGB_L$(HG) of the high gamma characteristic to the data lines of the display panel 15 and addresses the left eye image data $RGB_L$(HG) to the pixels of the display panel 15.

The liquid crystal shutter control signal reception unit 17 opens the left eye shutter $ST_L$ and shuts the right eye shutter $ST_R$ in response to the liquid crystal shutter control signal $C_{ST}$ of the high logic level during the nth frame period Fn. The controller 11 generates the backlight control signal $C_{BL}$ of the low logic level at a start time point of the nth frame period Fn and then converts the backlight control signal $C_{BL}$ from the low logic level to the high logic level at a time point when the predetermined time period T has elapsed from the start time point of the nth frame period Fn. The backlight driving circuit 13 turns on the light source of the backlight unit 16 at a time point when the predetermined time period T has elapsed from the start time point of the nth frame period Fn in response to the backlight control signal $C_{BL}$ of the high logic level in steps S103 to S106.

The controller 11 generates the display panel control signal $C_{DIS}$ during an address period ADDR of an (n+1)th frame period Fn+1. During the address period ADDR of the (n+1)th frame period Fn+1, the controller 11 supplies left eye image data $RGB_L$(LG), which is modulated based on a low gamma characteristic illustrated in FIG. 11C, to the data driving circuit and keeps the liquid crystal shutter control signal $C_{ST}$ at the high logic level. During the address period ADDR of the (n+1)th frame period Fn+1, the data driving circuit supplies the data voltage of the left eye image data $RGB_L$(LG) of the low gamma characteristic to the data lines of the display panel 15 and addresses the left eye image data $RGB_L$(LG) to the pixels of the display panel 15.

Figure 11C:
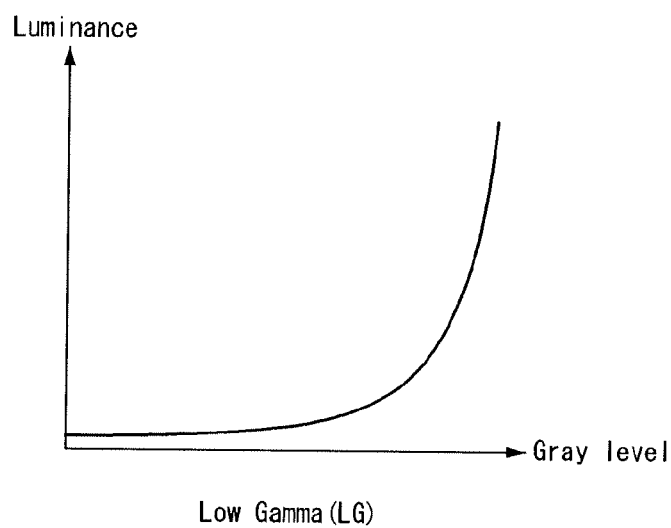

The left eye image data $RGB_L$(LG) of the low gamma characteristic illustrated in FIG. 11C further lowers a display luminance at a low gray level and a middle gray level, compared with the normal gamma characteristic illustrated in FIG. 11A. The backlight driving circuit 13 turns on the light source of the backlight unit 16 in response to the backlight control signal $C_{BL}$ of the high logic level during the (n+1)th frame period Fn+1. The liquid crystal shutter control signal reception unit 17 opens the left eye shutter $ST_L$ and shuts the right eye shutter $ST_R$ in response to the liquid crystal shutter control signal $C_{ST}$ of the high logic level during the (n+1)th frame period Fn+1 in steps S107 and 108.

During a vertical blanking period VB of the (n+1)th frame period Fn+1, the controller 11 converts the backlight control signal $C_{BL}$ from the high logic level to the low logic level and converts the liquid crystal shutter control signal $C_{ST}$ from the high logic level to the low logic level in steps S109 and 110. The backlight driving circuit 13 turns off the light source of the backlight unit 16 in response to the backlight control signal $C_{BL}$ of the low logic level during the vertical blanking period VB of the (n+1)th frame period Fn+1. The liquid crystal shutter control signal reception unit 17 shuts the left eye shutter $ST_L$ and opens the right eye shutter $ST_R$ in response to the liquid crystal shutter control signal $C_{ST}$ of the low logic level during the vertical blanking period VB of the (n+1)th frame period Fn+1 in steps S109 and 110.

The controller 11 generates the display panel control signal $C_{DIS}$ during an address period ADDR of an (n+2)th frame period Fn+2. During the address period ADDR of the (n+2)th frame period Fn+2, the controller 11 supplies right eye image data $RGB_R(HG)$, which is modulated based on the high gamma characteristic illustrated in FIG. 11B, to the data driving circuit and generates the liquid crystal shutter control signal $C_{ST}$ of a low logic level. During the address period ADDR of the (n+2)th frame period Fn+2, the data driving circuit supplies the data voltage of the right eye image data $RGB_R(HG)$ of the high gamma characteristic to the data lines of the display panel 15 and addresses the right eye image data $RGB_R(HG)$ to the pixels of the display panel 15. The liquid crystal shutter control signal reception unit 17 shuts the left eye shutter $ST_L$ and opens the right eye shutter $ST_R$ in response to the liquid crystal shutter control signal $C_{ST}$ of the low logic level during the address period ADDR of the (n+2)th frame period Fn+2. The controller 11 generates the backlight control signal $C_{BL}$ of the low logic level at a start time point of the (n+2)th frame period Fn+2 and then converts the backlight control signal $C_{BL}$ from the low logic level to the high logic level at a time point when the predetermined time period T has elapsed from the start time point of the (n+2)th frame period Fn+2. The backlight driving circuit 13 turns on the light source of the backlight unit 16 at a time point when the predetermined time period T has elapsed from the start time point of the (n+2)th frame period Fn+2 in response to the backlight control signal $C_{BL}$ of the high logic level in steps S111 to S114.

The controller 11 generates the display panel control signal $C_{DIS}$ during an address period ADDR of an (n+3)th frame period Fn+3. During the address period ADDR of the (n+3)th frame period Fn+3, the controller 11 supplies right eye image data $RGB_R(LG)$, which is modulated based on the low gamma characteristic illustrated in FIG. 11C, to the data driving circuit and keeps the liquid crystal shutter control signal $C_{ST}$ at the low logic level. During the address period ADDR of the (n+3)th frame period Fn+3, the data driving circuit supplies the data voltage of the right eye image data $RGB_R(LG)$ of the low gamma characteristic to the data lines of the display panel 15 and addresses the right eye image data $RGB_R(LG)$ to the pixels of the display panel 15. The backlight driving circuit 13 turns on the light source of the backlight unit 16 in response to the backlight control signal $C_{BL}$ of the high logic level during the (n+3)th frame period Fn+3. The liquid crystal shutter control signal reception unit 17 shuts the left eye shutter $ST_L$ and opens the right eye shutter $ST_R$ in response to the liquid crystal shutter control signal $C_{ST}$ of the low logic level during the (n+3)th frame period Fn+3 in steps S115 and 116.

During a vertical blanking period VB of the (n+3)th frame period Fn+3, the controller 11 converts the backlight control signal $C_{BL}$ from the high logic level to the low logic level and converts the liquid crystal shutter control signal $C_{ST}$ from the low logic level to the high logic level in steps S117 and 118. The backlight driving circuit 13 turns off the light source of the backlight unit 16 in response to the backlight control signal $C_{BL}$ of the low logic level during the vertical blanking period VB of the (n+3)th frame period Fn+3. The liquid crystal shutter control signal reception unit 17 opens the left eye shutter $ST_L$ and shuts the right eye shutter $ST_R$ in response to the liquid crystal shutter control signal $C_{ST}$ of the high logic level during the vertical blanking period VB of the (n+3)th frame period Fn+3.

A method for modulating the gamma characteristic of data may use methods disclosed in Korean Patent Application No. 10-2006-0108849 (Nov. 6, 2006), Korean Patent Application No. 10-2006-0078873 (Aug. 21, 2006), Korean Patent Application No. 10-2007-0038438 (Apr. 19, 2007), Korean Patent Application No. 10-2006-0139203 (Dec. 30, 2006), etc. corresponding to the present applicant, and which are hereby incorporated by reference in their entirety.

In the response characteristic of the liquid crystals, the falling time $\tau_f$ of the liquid crystals may be greater than the rising time $\tau_r$ of the liquid crystals as shown in FIG. 7. In this case, if a duration of a frame period during which the left and right image data $RGB_L(LG)$ and $RGB_R(LG)$ of the low gamma characteristic are addressed is short as shown in FIGS. 9 and 10, it is difficult to sufficiently charge the liquid crystal cells to the data during the short frame period. In particular, when the frame frequency is equal to or greater than 200 Hz, the duration of the frame period is shortened. Therefore, charging time of the liquid crystal cells to data, which is modulated based on the low gamma characteristic, is insufficient. To solve such a problem, in the second exemplary embodiment of the invention, as shown in FIG. 12, the controller 11 controls so that the vertical blanking periods VB of the frame periods Fn+1 and Fn+3 during which the left and right image data $RGB_L(LG)$ and $RGB_R(LG)$ of the low gamma characteristic are addressed are longer than the vertical blanking periods VB of the frame periods Fn and Fn+2 during which the left and right image data $RGB_L(HG)$ and $RGB_R(HG)$ of the high gamma characteristic are addressed.

In the response characteristic of the liquid crystals, as shown in FIG. 13, the rising time $\tau_r$ of the liquid crystals may be greater than the falling time $\tau_f$ of the liquid crystals. In this case, it is preferable that a duration of a frame period during which the left and right image data $RGB_L$ and $RGB_R$ are addressed sufficiently increases. In the third exemplary embodiment of the invention, as shown in FIG. 14, the controller 11 controls so that the durations of the vertical blanking periods VB of the frame periods Fn and Fn+2 during which the left and right eye image data $RGB_L$ and $RGB_R$ are addressed are longer than the durations of the vertical blanking periods VB of the frame periods Fn+1 and Fn+3 during which the black data is addressed.

In the response characteristic of the liquid crystals, as shown in FIG. 13, the rising time $\tau_r$ of the liquid crystals may be greater than the falling time $\tau_f$ of the liquid crystals. In this case, it is preferable that a duration of a frame period during which the left and right image data $RGB_L(HG)$ and $RGB_R(HG)$ of the high gamma characteristic are addressed sufficiently increases. In the fourth exemplary embodiment of the invention, as shown in FIG. 15, the controller 11 controls so that the vertical blanking periods VB of the frame periods Fn and Fn+2 during which the left and right image data $RGB_L(HG)$ and $RGB_R(HG)$ of the high gamma characteristic are addressed are longer than the vertical blanking periods VB of the frame periods Fn+1 and Fn+3 during which the left and right image data $RGB_L(LG)$ and $RGB_R(LG)$ of the low gamma characteristic are addressed.

FIG. 16 is a flow chart illustrating a method of driving the stereoscopic image display according to the third exemplary embodiment of the invention. FIG. 17 is a waveform diagram illustrating a driving waveform of the stereoscopic image display according to the third exemplary embodiment of the invention. The third exemplary embodiment will be described in detail in association with the stereoscopic image display illustrated in FIGS. 3 and 4.

As shown in FIGS. 16 and 17, the controller 11 separates the left eye image data $RGB_L$ and the right eye image data $RGB_R$ from the input digital video data RGB and counts frame periods and lines in steps S151 and S152.

The controller 11 generates the display panel control signal $C_{DIS}$ and supplies first left eye image data $RGB_L(1)$ to the data driving circuit during an address period ADDR of an nth frame period Fn. During the address period ADDR of the nth frame period Fn, the controller 11 generates the backlight control signal $C_{BL}$ of a low logic level and the liquid crystal shutter control signal $C_{ST}$ of a high logic level. During the address period ADDR of the nth frame period Fn, the data driving circuit supplies the data voltage of the first left eye image data $RGB_L(1)$ to the data lines of the display panel 15 and addresses the first left eye image data $RGB_L(1)$ to the pixels of the display panel 15. The backlight driving circuit 13 turns off the light source of the backlight unit 16 in response to the backlight control signal $C_{BL}$ of the low logic level during the nth frame period Fn. The liquid crystal shutter control signal reception unit 17 opens the left eye shutter $ST_L$ and shuts the right eye shutter $ST_R$ in response to the liquid crystal shutter control signal $C_{ST}$ of the high logic level during the nth frame period Fn in steps S153 and S154.

During an address period ADDR of an (n+1)th frame period Fn+1, the controller 11 generates the display panel control signal $C_{DIS}$, supplies second left eye image data $RGB_L(2)$ to the data driving circuit, and keeps the liquid crystal shutter control signal $C_{ST}$ at the high logic level in steps S155 and S156. Subsequently, the controller 11 converts the backlight control signal $C_{BL}$ from the low logic level to the high logic level at a time point when the predetermined time period T has elapsed from a start time point of the (n+1)th frame period Fn+1. During the address period ADDR of the (n+1)th frame period Fn+1, the data driving circuit supplies the data voltage of the second left eye image data $RGB_L(2)$ to the data lines of the display panel 15 and addresses the second left eye image data $RGB_L(2)$ to the pixels of the display panel 15. The backlight driving circuit 13 turns on the light source of the backlight unit 16 at a time point when the predetermined time period T has elapsed from the start time point of the (n+1)th frame period Fn+1 in response to the backlight control signal $C_{BL}$ of the high logic level in steps S157 and S158. The liquid crystal shutter control signal reception unit 17 opens the left eye shutter $ST_L$ and shuts the right eye shutter $ST_R$ in response to the liquid crystal shutter control signal $C_{ST}$ of the high logic level during the (n+1)th frame period Fn+1.

During a vertical blanking period VB of the (n+1)th frame period Fn+1, the controller 11 converts the backlight control signal $C_{BL}$ from the high logic level to the low logic level and then converts the liquid crystal shutter control signal $C_{ST}$ from the high logic level to the low logic level. The backlight driving circuit 13 turns off the light source of the backlight unit 16 in response to the backlight control signal $C_{BL}$ of the low logic level during the vertical blanking period VB of the (n+1)th frame period Fn+1. The liquid crystal shutter control signal reception unit 17 shuts the left eye shutter $ST_L$ and opens the right eye shutter $ST_R$ in response to the liquid crystal shutter control signal $C_{ST}$ of the low logic level during the vertical blanking period VB of the (n+1)th frame period Fn+1 in steps S159 and 160.

The controller 11 generates the display panel control signal $C_{DIS}$ and supplies first right eye image data $RGB_R(1)$ to the data driving circuit during an address period ADDR of an (n+2)th frame period Fn+2. During the address period ADDR of the (n+2)th frame period Fn+2, the controller 11 generates the backlight control signal $C_{BL}$ of a low logic level and the liquid crystal shutter control signal $C_{ST}$ of a low logic level. During the address period ADDR of the (n+2)th frame period Fn+2, the data driving circuit supplies the data voltage of the first right eye image data $RGB_R(1)$ to the data lines of the display panel 15 and addresses the first right eye image data $RGB_R(1)$ to the pixels of the display panel 15. The backlight driving circuit 13 turns off the light source of the backlight unit 16 in response to the backlight control signal $C_{BL}$ of the low logic level during the (n+2)th frame period Fn+2. The liquid crystal shutter control signal reception unit 17 shuts the left eye shutter $ST_L$ and opens the right eye shutter $ST_R$ in response to the liquid crystal shutter control signal $C_{ST}$ of the low logic level during the (n+2)th frame period Fn+2 in steps S161 and S162.

During an address period ADDR of an (n+3)th frame period Fn+3, the controller 11 generates the display panel control signal $C_{DIS}$, supplies second right eye image data $RGB_R(2)$ to the data driving circuit, and keeps the liquid crystal shutter control signal $C_{ST}$ at the low logic level. Subsequently, the controller 11 converts the backlight control signal $C_{BL}$ from the low logic level to the high logic level at a time point when the predetermined time period T has elapsed from a start time point of the (n+3)th frame period Fn+3. During the address period ADDR of the (n+3)th frame period Fn+3, the data driving circuit supplies the data voltage of the second right eye image data $RGB_R(2)$ to the data lines of the display panel 15 and addresses the second right eye image data $RGB_R(2)$ to the pixels of the display panel 15. The backlight driving circuit 13 turns on the light source of the backlight unit 16 at a time point when the predetermined time period T has elapsed from the start time point of the (n+3)th frame period Fn+3 in response to the backlight control signal $C_{BL}$ of the high logic level. The liquid crystal shutter control signal reception unit 17 shuts the left eye shutter $ST_L$ and opens the right eye shutter $ST_R$ in response to the liquid crystal shutter control signal $C_{ST}$ of the low logic level during the (n+3)th frame period Fn+3 in steps S163 to S166.

During a vertical blanking period VB of the (n+3)th frame period Fn+3, the controller 11 converts the backlight control signal $C_{BL}$ from the high logic level to the low logic level and then converts the liquid crystal shutter control signal $C_{ST}$ from the low logic level to the high logic level. The backlight driving circuit 13 turns off the light source of the backlight unit 16 in response to the backlight control signal $C_{BL}$ of the low logic level during the vertical blanking period VB of the (n+3)th frame period Fn+3. The liquid crystal shutter control signal reception unit 17 opens the left eye shutter $ST_L$ and shuts the right eye shutter $ST_R$ in response to the liquid crystal shutter control signal $C_{ST}$ of the high logic level during the vertical blanking period VB of the (n+3)th frame period Fn+3 in steps S167 and 168.

The second left eye image data $RGB_L(2)$ is the same as the first left eye image data $RGB_L(1)$, and the second right eye image data $RGB_R(2)$ is the same as the first right eye image data $RGB_R(1)$.

In the fifth exemplary embodiment of the invention, as shown in FIG. 18, the controller 11 controls so that the vertical blanking period VB of the frame period Fn during which the first left eye image data $RGB_L(1)$ is addressed is longer than the vertical blanking period VB of the frame period Fn+1 during which the second left eye image data $RGB_L(2)$ is addressed. Further, the controller 11 controls so that the vertical blanking period VB of the frame period Fn+2 during which the first right eye image data $RGB_R(1)$ is addressed is longer than the vertical blanking period VB of the frame period Fn+2 during which the second right eye image data $RGB_R(2)$ is addressed. The control method described in the fifth exemplary embodiment may obtain an effect similar to an overdriving compensation effect. An overdriving compensation method increases a value of $|V_a^2 - V_F^2|$ in the above Equation 1 based on change or non-change of data, thereby advancing response time of the liquid crystals. If the vertical blanking period VB of the frame period Fn during which the first left eye image data $RGB_L(1)$ is addressed is extended, a current frame may be maintained until a luminance of the liquid crystal cells reaches a target luminance. Therefore, the effect similar to the overdriving compensation effect may be obtained even if the data voltage is not modulated.

In the exemplary embodiments of the invention, the liquid crystal display is mainly described as the display device, but without being limited thereto, the display device according to the exemplary embodiments of the invention may be implemented as a flat panel display device, such as a field emission display, a plasma display panel, and an electroluminescence device (EL) including an inorganic field emission display and an organic light emitting diode (OLED), as well as the liquid crystal display.

As described above, in the exemplary embodiments of the invention, when the left eye image data and the right eye image data are time-division displayed on the display device and the stereoscopic image is implemented by time-dividing the liquid crystal shutter glasses, the crosstalk between the left eye image and the right eye image can be solved by controlling the turn-on and turn-off operations of the backlight unit. In addition, the flicker appearing in the stereoscopic image display method in which the vertical blanking period is extended and a shutter opening period of the liquid crystal shutter glasses is shortened can be solved. Further, power consumption can be reduced.

Furthermore, in the exemplary embodiments of the invention, the display device is driven in the optimum response characteristic of the display device by asymmetrically controlling the vertical blanking period of the frame period during which the continued black data is addressed and the vertical blanking period of the frame period during which the image data is addressed. As a result, the display quality of the stereoscopic image display according to the exemplary embodiments of the invention can increase.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A stereoscopic image display comprising:
    a display panel that displays a left-eye image and a right-eye image;
    shutter glasses including a left eye shutter and a right eye shutter that are alternately turned on and off in synchronization with the display panel;
    a backlight unit that irradiates light to the display panel and is periodically turned on and off in synchronization with the display panel and the shutter glasses;
    a controller to receive video control signals, the controller comprising:
    a first control signal generating unit to generate and output a display panel control signal to the display panel during a frame period for each of the left-eye image and the right-eye image while controlling writing image data during an address period and during a vertical blanking period, and to generate and output a shutter glasses control signal;
    a frame counter to count at least one of the video control signals to generate a frame count signal;
    a line counter to count at least one of the video control signals to generate a line count signal;
    a data separating unit to receive input video data and separate the input video data into left-eye image data and right-eye image data and output the left-eye image data and the right-eye image data to a display panel driving circuit for driving the display panel during the address period;
    and a second control signal generating unit to receive the frame count signal and the line count signal and generate and output a backlight control signal for controlling the backlight unit,
    wherein the frame period includes the address period and the vertical blanking period,
    wherein the controller outputs the left-eye image data and left-eye vertical blanking during an nth frame period and the right-eye image data and right-eye vertical blanking during an (n+2)th frame period,
    wherein the controller turns on the backlight unit after a predetermined time at a beginning of the nth frame period while the left-eye image data and left-eye vertical blanking are output and turns off the backlight unit at the end of an (n+1)th frame period, and turns on the backlight unit after a predetermined time at a beginning of the (n+2)th frame period while the right-eye image data and right-eye vertical blanking are outputted and turns off the backlight unit at the end of an (n+3)th frame period,
    and wherein a vertical blanking period of the (n+1)th frame period is different than a vertical blanking period of the nth frame period.

2. The stereoscopic image display of claim 1, wherein the controller outputs one of the left eye image data and the right eye image data to the display panel driving circuit during the address period, and then outputs all black data to the display panel driving circuit during the vertical blanking period.

3. The stereoscopic image display of claim 1, wherein the controller outputs one of the left eye image data with a high gamma characteristic and the right eye image data with a high gamma characteristic to the display panel driving circuit during a first address period, and then outputs one of the left eye image data with a low gamma characteristic and the right eye image data with a low gamma characteristic to the display panel driving circuit during a second address period.

4. The stereoscopic image display of claim 1, wherein the vertical blanking period of the (n+1)th frame period is longer than the vertical blanking period of the nth frame period.

5. The stereoscopic image display of claim 4, wherein the controller outputs one of the left eye image data and the right eye image data to the display panel driving circuit during a first address period, and then outputs all black data to the display panel driving circuit during a second address period.

6. The stereoscopic image display of claim 4, wherein the controller outputs one of the left eye image data with a high gamma characteristic and the right eye image data with a high gamma characteristic to the display panel driving circuit during the first address period, and then outputs one of left eye image data with a low gamma characteristic and the right eye image data with a low gamma characteristic to the display panel driving circuit during the second address period.

7. The stereoscopic image display of claim 4, wherein the controller outputs first left eye image data to the display panel driving circuit during a first address period, and then outputs second left eye image data to the display panel driving circuit during a second address period.

8. The stereoscopic image display of claim 4, wherein the controller outputs first right eye image data to the display panel driving circuit during a first address period, and then outputs second right eye image data to the display panel during a second address period.

9. A method of driving a stereoscopic image display comprising: receiving video control signals; generating and outputting a display panel control signal to a display panel during a frame period while controlling writing image data during an address period and during a vertical blanking period;
generating and outputting a shutter glasses control signal alternately turning on and off a left eye shutter and a right eye shutter of shutter glasses in synchronization with the display panel;
counting at least one of the video control signals to generate a frame count signal;
counting at least one of the video control signals to generate a line count signal;
receiving input video data and separating the input video data into left-eye image data and right-eye image data and outputting the left-eye image data and the right-eye image data to a display panel driving circuit for driving the display panel during the address period;
and receiving the frame count signal and the line count signal and generating and outputting a backlight control signal periodically turning on and off a backlight unit for irradiating light to the display panel,
wherein the frame period includes the address period and the vertical blanking wherein a controller outputs the left-eye image data and left-eye vertical blanking data during an nth frame period and the fight-eye image data and right-eye vertical blanking data during an (n+1)th frame period,
wherein the controller turns on the backlight unit after a predetermined time at a beginning of the nth frame period while the left-eye image data and left-eye vertical blanking data are output and turns off the backlight unit at the end of the nth frame period, and turns on the backlight unit after a predetermined time at a beginning of the (n+1)th frame period while the right-eve image data and right-eve vertical blanking data are output and turns off the backlight unit at the end of the (n+1)th frame period, and wherein a vertical blanking period of the (n+1)th frame period is different than a vertical blanking period of the nth frame period.

10. The method of claim 9, wherein the outputting a display panel control signal to a display panel during a frame period comprises:
outputting one of the left eye image data and the right eye image data to the display panel during a first address period; and
outputting all black data to the display panel during a second address period.

11. The method of claim 9, wherein the outputting a display panel control signal to a display panel during a frame period comprises:
outputting one of the left eye image data with a high gamma characteristic and the right eye image data with a high gamma characteristic to the display panel driving circuit during a first address period; and
outputting one of the left eye image data with a low gamma characteristic and the right eye image data with a low gamma characteristic to the display panel during a second address period.

12. The method of claim 9, wherein the vertical blanking period of the (n+1)th frame period is longer than the vertical blanking period of the nth frame period.

13. The method of claim 12, wherein the outputting a display panel control signal to a display panel during a frame period comprises:
outputting one of the left eye image data and the right eye image data to the display panel during a first address period; and
outputting all black data to the display panel during a second address period.

14. The method of claim 12, wherein the outputting a display panel control signal to a display panel during a frame period comprises:
outputting one of left eye image data with a high gamma characteristic and right eye image data with a high gamma characteristic to the display panel driving circuit during a first address period; and
outputting one of left eye image data with a low gamma characteristic and right eye image data with a low gamma characteristic to the display panel during a second address period.

15. The method of claim 12, wherein the outputting a display panel control signal to a display panel during a frame period comprises:
outputting first left eye image data to the display panel during a first address period; and
outputting second left eye image data to the display panel during a second address period.

16. The method of claim 12, wherein the outputting a display panel control signal to a display panel during a frame period comprises:
outputting first right eye image data to the display panel during a first address period; and
outputting second right eye image data to the display panel during a second address period.

* * * * *